(12) United States Patent
Scarlatescu et al.

(10) Patent No.: US 9,509,221 B2
(45) Date of Patent: Nov. 29, 2016

(54) FORWARD BOOST POWER CONVERTERS WITH TAPPED TRANSFORMERS AND RELATED METHODS

(71) Applicant: SOLANTRO SEMICONDUCTOR CORP., Ottawa (CA)

(72) Inventors: Gabriel Scarlatescu, Bucharest (RO); Raymond Kenneth Orr, Kanata (CA); Edward Keyes, Ottawa (CA)

(73) Assignee: Solantro Semiconductor Corp. (CA)

( * ) Notice: Subject to any disclaimer, the term of this patent is extended or adjusted under 35 U.S.C. 154(b) by 232 days.

(21) Appl. No.: 14/132,686

(22) Filed: Dec. 18, 2013

(65) Prior Publication Data

US 2015/0171759 A1    Jun. 18, 2015

(51) Int. Cl.
*H02M 3/335* (2006.01)
*H02M 1/00* (2006.01)

(52) U.S. Cl.
CPC ..... *H02M 3/33553* (2013.01); *H02M 3/33523* (2013.01); *H02M 3/33546* (2013.01); *H02M 3/33584* (2013.01); *H02M 3/33592* (2013.01); *H02M 2001/0058* (2013.01); *H02M 2001/0064* (2013.01); *Y02B 70/1491* (2013.01)

(58) Field of Classification Search
CPC ............. H02M 2001/0058; H02M 2001/0064
USPC ............ 363/16, 21.09, 19, 20, 21.01, 21.02, 363/21.04, 21.06, 21.12, 21.14, 56.01, 363/56.09, 56.12, 97, 101, 124; 323/209, 323/222
See application file for complete search history.

(56) References Cited

U.S. PATENT DOCUMENTS

| 4,415,959 | A | 11/1983 | Vinciarelli |  |
|---|---|---|---|---|
| 6,934,167 | B2 | 8/2005 | Jang et al. |  |
| 7,606,051 | B1 | 10/2009 | Wittenbreder, Jr. |  |
| 2011/0032731 | A1 | 2/2011 | Coleman et al. |  |
| 2013/0169039 | A1* | 7/2013 | Zhu | H02M 3/33592 307/10.1 |
| 2013/0250626 | A1* | 9/2013 | Hosotani | H02M 3/33553 363/21.02 |
| 2013/0336013 | A1* | 12/2013 | Mueller | H02M 3/33569 363/17 |
| 2014/0153290 | A1* | 6/2014 | Li | H02M 3/3376 363/17 |

OTHER PUBLICATIONS

Non-Final Office Action issued Oct. 15, 2014 in respect of U.S. Appl. No. 13/657,171 (6 pages).
Non-Final Office Action issued Jan. 16, 2015 in respect of U.S. Appl. No. 13/657,171 (11 pages including Notice of References Cited and Information Disclosure Statement).
Final Office Action issued Jun. 22, 2015 in respect of U.S. Appl. No. 13/657,171 (11 pages).

* cited by examiner

*Primary Examiner* — Jessica Han
*Assistant Examiner* — David A. Singh
(74) *Attorney, Agent, or Firm* — Barnes & Thornburg LLP

(57) ABSTRACT

In a switching mode power converter coupled between first and second terminal pairs, a first circuit path includes a first inductance and a first switch. A tapped transformer has a first winding coupled across the first inductance and a tapped second winding with a tapped winding portion. A second circuit path includes a capacitance coupled to a second inductance, and the second circuit path is coupled to the first inductance through the tapped winding portion in a third circuit path and through the second winding in a fourth circuit path. During their respective conduction periods, the first switch couples the first inductance across the first terminal pair, a second switch completes a circuit between the second terminal pair and the second circuit path or the third circuit path, and a third switch completes a circuit that includes another of the second circuit path and the fourth circuit path.

20 Claims, 19 Drawing Sheets

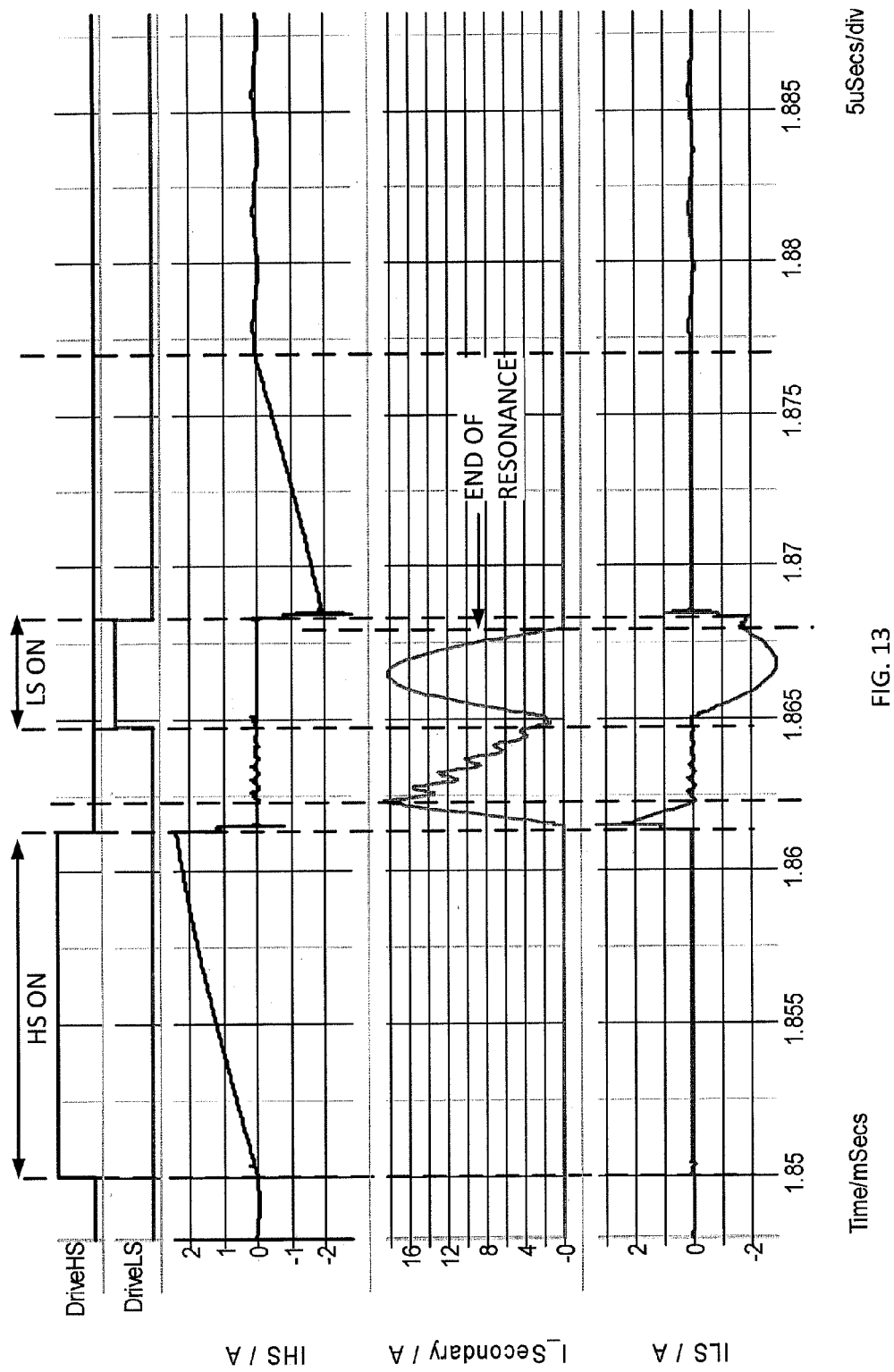

FORWARD BOOST POWER CONVERTERS WITH TAPPED TRANSFORMERS AND RELATED METHODS

FIELD OF THE INVENTION

This invention relates generally to switching power converters and more particularly to power converters with resonant topologies. Power converters are alternatively referred to as DC (Direct Current) to DC converters, DC to AC (Alternating Current) converters, AC to AC converters, AC to DC converters, DC or DC to DC regulators, AC or AC to DC regulators, switching mode power converters, switch mode regulators or power supplies, etc. The term "power converter" or "converter" is used herein to include all such terms.

BACKGROUND

A power converter is a circuit which converts current at one voltage to current at another voltage. Switching converters use one or more switches to effect this conversion. Resonant converters are converters that use inductive and capacitive (LC) reactive elements in resonance to transfer power from an input source to the output.

Design objectives of power converters include: maximizing power conversion efficiency from input to output; minimizing component count and cost; and minimizing stress on the various converter components to maximize reliability. Another important design objective is a monotonic power transfer function. The transfer function relates the output power of the converter to its control variable. For frequency modulated converters, the control variable is the switching frequency.

SUMMARY

In an aspect, a switching mode power converter, coupled between a first terminal pair and a second terminal pair, includes: a first inductance coupled to a first switch in a first circuit path across the first terminal pair, the first switch coupling the first inductance across the first terminal pair during a conduction period of the first switch; a tapped transformer having a first winding coupled across the first inductance and a second winding, the second winding having a tapped winding portion; a capacitance coupled to a second inductance in a second circuit path, the second circuit path being coupled to the first inductance through the tapped winding portion in a third circuit path and coupled to the first inductance through the second winding in a fourth circuit path; a second switch and a third switch, the second switch completing a circuit between the second terminal pair and one of: the second circuit path and the third circuit path through the tapped winding portion during a conduction period of the second switch, the third switch completing a circuit comprising another of: the second circuit path and the fourth circuit path through the second winding during a conduction period of the third switch.

In some embodiments, the first terminal pair and the second terminal pair share a common terminal.

The first terminal pair could be an input terminal pair and the second terminal pair could be an output terminal pair, with the capacitance transferring energy to the output terminal pair during the conduction period of the second switch. The first inductance could then be coupled to the capacitance and transfer energy to the output terminal pair during the conduction period of the second switch. The first inductance could instead be coupled to the capacitance and transfer energy to the capacitance during the conduction period of the third switch.

In another embodiment, the first terminal pair is an output terminal pair and the second terminal pair is an input terminal pair, and the first inductance transfers energy to the output terminal pair during the conduction period of the first switch. The first inductance could be coupled to the capacitance and store energy from the input terminal pair during the conduction period of the second switch, and the first inductance and the capacitance transfer energy to the output terminal pair during the conduction period of the first switch. The capacitance could transfer energy to the output terminal pair during the conduction period of the third switch.

The first inductance could be or include magnetisation inductance of the transformer.

The second inductance could be or include leakage inductance of the transformer.

A method of operation of a switching mode power converter coupled between a first terminal pair and a second terminal pair is also provided. The converter includes: a first inductance coupled to a first switch in a first circuit path across the first terminal pair; a tapped transformer having a first winding coupled across the first inductance and a second winding, the second winding having a tapped winding portion; a capacitance coupled to a second inductance in a second circuit path, the second circuit path being coupled to the first inductance through the tapped winding portion in a third circuit path and coupled to the first inductance through the second winding in a fourth circuit path; a second switch and a third switch. The method involves: closing of the first switch to couple the first inductance across the first terminal pair during a conduction period of the first switch; closing of the second switch to complete a circuit between the second terminal pair and one of: the second circuit path and the third circuit path through the tapped winding portion during a conduction period of the second switch so as to transfer energy into the second terminal pair; closing of the third switch to complete a circuit comprising another of: the second circuit path and the fourth circuit path through the second winding during a conduction period of the third switch so as to transfer energy into the capacitance.

Another aspect provides apparatus including: a switching mode power converter coupled between a first terminal pair and a second terminal pair, the converter comprising: a first inductance coupled to a first switch in a first circuit path across the first terminal pair; a tapped transformer having a first winding coupled across the first inductance and a second winding, the second winding having a tapped winding portion; a capacitance coupled to a second inductance in a second circuit path, the second circuit path being coupled to the first inductance through the tapped winding portion in a third circuit path and coupled to the first inductance through the second winding in a fourth circuit path; a second switch and a third switch; means for closing the first switch to couple the first inductance across the first terminal pair during a conduction period of the first switch; means for closing the second switch to complete a circuit between the second terminal pair and one of: the second circuit path and the third circuit path through the tapped winding portion during a conduction period of the second switch so as to transfer energy into the second terminal pair; means for closing the third switch to complete a circuit comprising another of: the second circuit path and the fourth circuit path through the second winding during a conduction period of the third switch so as to transfer energy into the capacitance.

According to a further aspect, a switching mode power converter coupled between a first terminal pair and a second terminal pair includes: a first inductance coupled to a first switch in a first circuit path across the first terminal pair, the first switch coupling the first inductance across the first terminal pair during a conduction period of the first switch; a capacitance coupled to a second inductance in a second circuit path; a tapped transformer having a first winding coupled across the first inductance and a second winding coupled to the second circuit path, the second winding having a tapped winding portion; a second switch and a third switch, the second switch completing a circuit between the second terminal pair and the second circuit path through the tapped winding portion during a conduction period of the second switch, the switch completing a circuit comprising the second circuit path and the second winding during a conduction period of the third switch.

The second circuit path could be further coupled to the first inductance through the second winding during the conduction period of the third switch.

The second circuit path could be further coupled to the first inductance through the tapped winding portion during the conduction period of the second switch.

The first terminal pair and the second terminal pair share a common terminal in some embodiments.

The first inductance could be or include magnetisation inductance of the transformer.

The second inductance could be or include leakage inductance of the transformer.

BRIEF DESCRIPTION OF THE DRAWINGS

Examples of embodiments of the present disclosure will now be described in greater detail with reference to the accompanying drawings.

FIG. 13 is a graph illustrating simulated high side and low side switch drive voltages and current waveforms for the high side switch 1020, low side switch 1022 and secondary winding for the example tapped forward boost converter 1000 in FIG. 10.

Figure 1A:
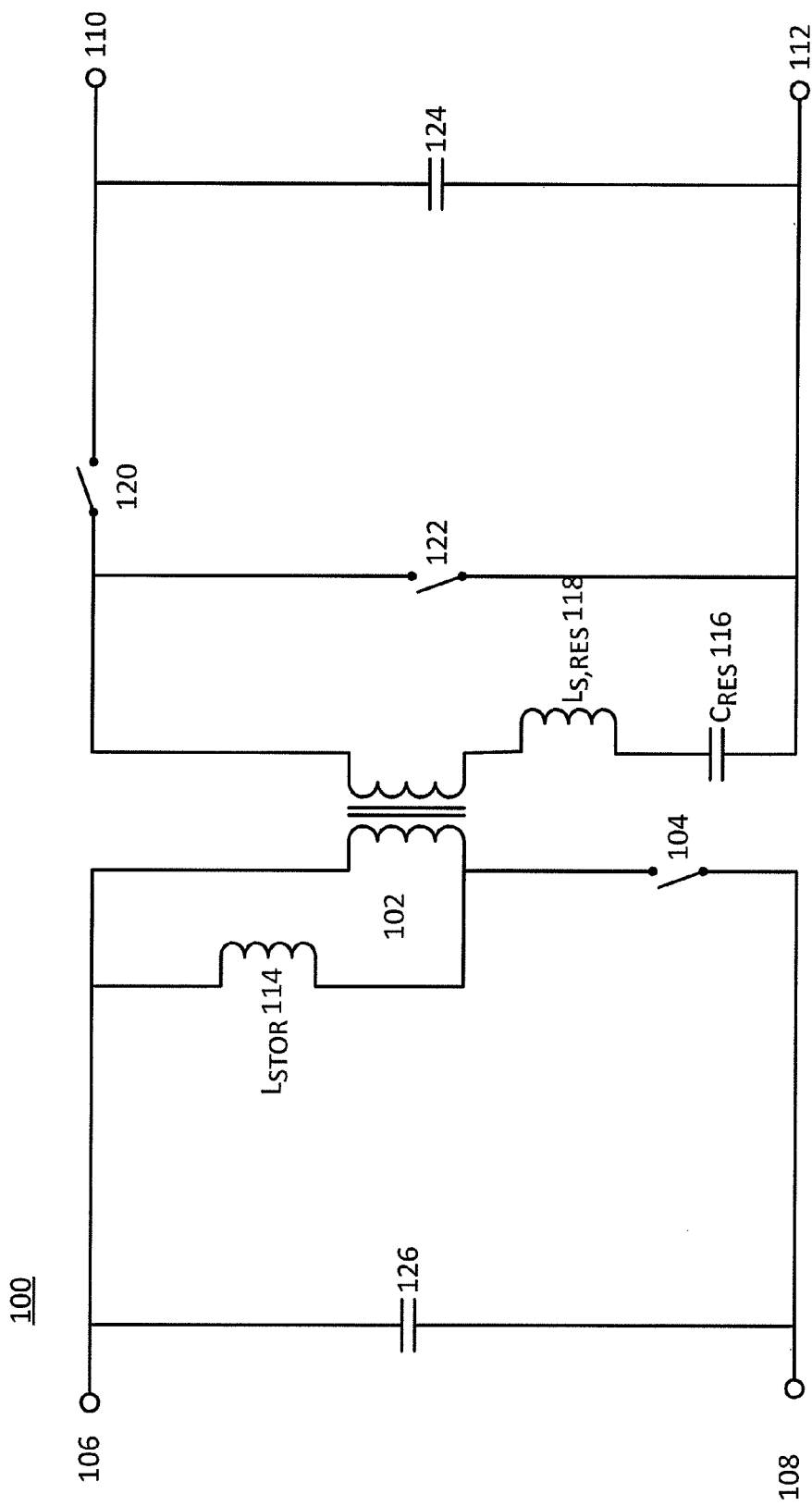
FIG. 1A is a schematic diagram illustrating an example forward boost converter.

It should be appreciated that the contents of the drawings are intended solely for illustrative purposes, and that the present disclosure is in no way limited to the particular example embodiments explicitly shown in the drawings and described herein.

DETAILED DESCRIPTION

FIG. 1A is a schematic diagram illustrating an example forward boost converter. Such a forward boost converter is disclosed in U.S. Provisional Patent Application No. 61/711,529 filed on Oct. 9, 2012, and in U.S. patent application Ser. No. 13/657,171 filed on Oct. 22, 2012, the entire contents of both of which are incorporated herein by reference.

In the example forward boost converter 100, the primary winding of a transformer 102 is coupled at one end or terminal to a terminal 106 of a terminal pair 106, 108. The other end or terminal of the primary winding is coupled to a primary switch 104, which switchably couples the primary winding to the other terminal 108 of the terminal pair 106, 108. Transformer 102 provides energy storage, and optionally voltage multiplication. The transformer 102 has a turns ratio of N, where N is the ratio of the number of turns in the secondary winding to the number of turns in the primary winding. Transformer 102 has been drawn with a single secondary winding in FIG. 1. However, the forward boost topology in FIG. 1 could be used with transformers having multiple secondary windings.

The primary side of the transformer 102 has a storage inductance $L_{STOR}$ 114 coupled across the primary winding. The secondary winding of the transformer 102 is coupled to resonant capacitance $C_{RES}$ 116 and resonant inductance $L_{S,RES}$ 118. This series combination of the secondary winding, $L_{S,RES}$ 118, and $C_{RES}$ 116 is shunted by a switch 122, connects to terminal 110 through switch 120, and connects to terminal 112. Storage capacitance 124 is coupled across terminals 110, 112.

Switches 104, 120 and 122 may be implemented in a variety of ways, including power MOSFETs (Metal Oxide Semiconductor Field Effect Transistors), BJTs (Bipolar Junction Transistors), IGBTs (Insulated Gate Bipolar Transistors), junction diodes, and/or mechanical relays, for example. In the case of controllable switches, the opening and closing of switches 104, 120 and 122 may be controlled by a control means which is not shown.

The example converter 100 illustrated in FIG. 1A is bi-directional. Depending on the operation of switches 104, 120 and 122, power may be supplied to terminals 106 and 108 and output at terminals 110 and 112 or alternatively, power can be supplied to terminals 110 and 112 and output at terminals 106 and 108. The presence of capacitance 124 and capacitance 126 is dependent on the direction of power flow in the example converter 100. For instance, if the example converter 100 were to only operate with terminals 106 and 108 as the input then capacitance 126 might be unnecessary. Similarly if the example converter 100 were to only operate with terminals 110 and 112 as the input then capacitance 124 might be unnecessary. In practical implementations, however, it is expected that a capacitance 124, 126 would be coupled across each terminal pair 106, 108 and 110, 112. Capacitance across the input terminal pair, which could be 106, 108 or 110, 112 as noted above, need not necessarily be provided in a converter circuit, but could instead be in the form of a capacitance across the output terminals of a voltage source to which the converter circuit is coupled, for example.

Figure 1B:
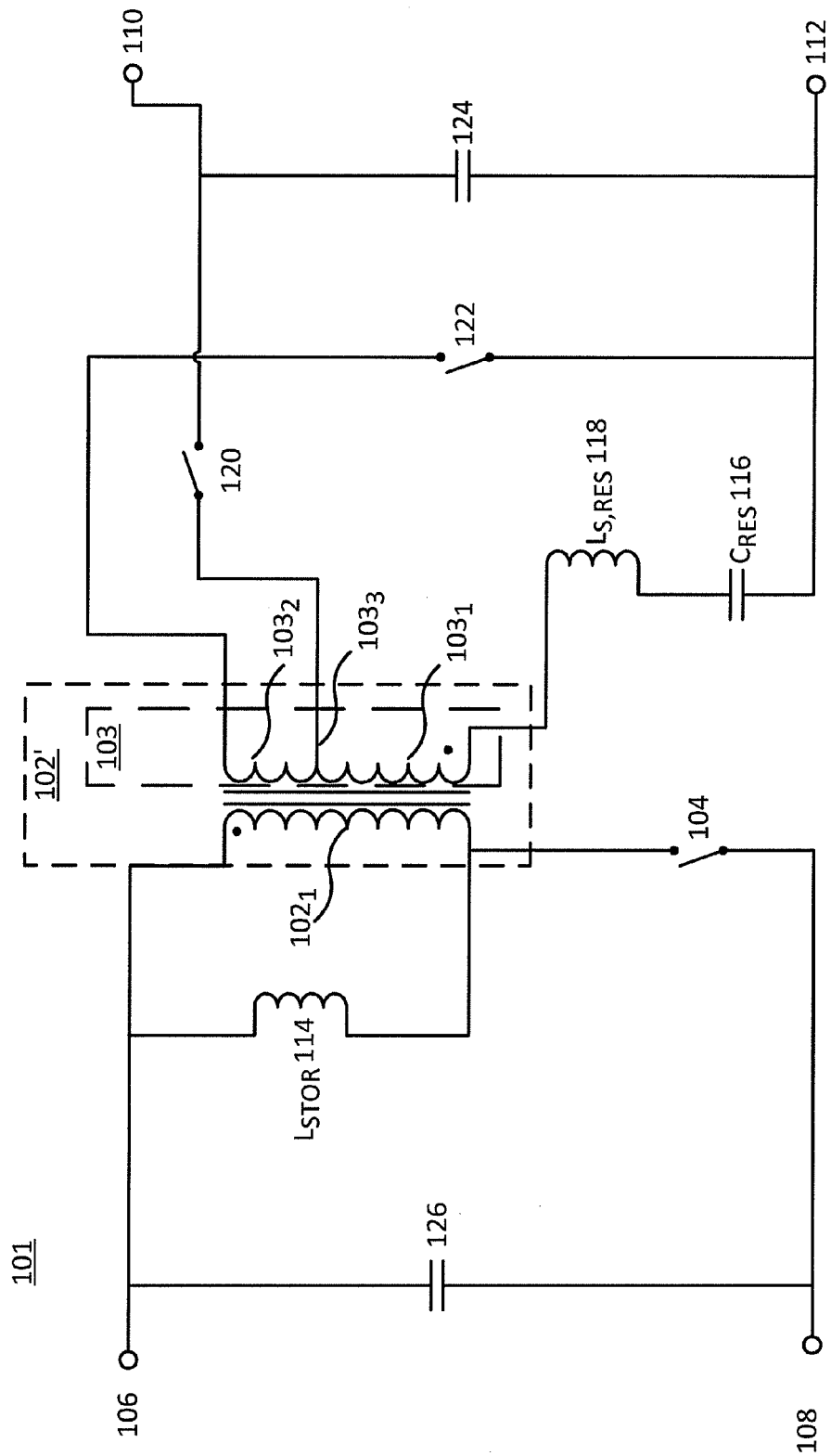
FIG. 1B is a schematic diagram illustrating an example converter having a converter topology which is referred to herein as "tapped forward boost".

FIG. 1B is a schematic diagram illustrating an example converter of a converter topology which is referred to herein as "tapped forward boost".

In the example tapped forward boost converter 101, transformer 102' comprises primary winding $102_1$ and secondary winding 103. Primary winding $102_1$ is coupled at one end or terminal to a terminal 106 of a terminal pair 106, 108. The other end or terminal of primary winding $102_1$ is coupled to a primary switch 104, which switchably couples the primary winding to the other terminal 108 of the terminal pair 106, 108. Transformer 102' provides energy storage, and optionally voltage multiplication. Transformer 102' has been drawn with a single tapped secondary winding 103 in FIG. 1B. However, the tapped forward boost topology disclosed herein could be used with transformers having multiple secondary windings.

Primary winding $102_1$ has a storage inductance $L_{STOR}$ 114 coupled across it. Secondary winding 103 is divided by tap connection $103_3$ into first portion $103_1$ and second portion $103_2$.

Transformer 102' has a "transformer turns ratio" of N, where N is the ratio of the number of turns in secondary winding 103 to the number of turns in primary winding $102_1$. Transformer 102' has a "tapped turns ratio" of $N_T$, where $N_T$ is the ratio of the number of turns in first portion of secondary winding $103_1$ to the number of turns in primary winding $102_1$. In one embodiment $N_T$ has a value that is ¾ of the value of N, although other $N_T/N$ relative values are possible.

Secondary winding 103 is coupled to resonant capacitance 116 and resonant inductance 118. This series combination of secondary winding 103, resonant inductance 118, and resonant capacitance 116 is shunted by switch 122. The series combination of resonant capacitance 116, resonant inductance 118 and first portion of secondary winding $103_1$ connects to terminal 110 through switch 120, and connects to terminal 112. Storage capacitance 124 is coupled across terminals 110, 112.

Figure 1C:
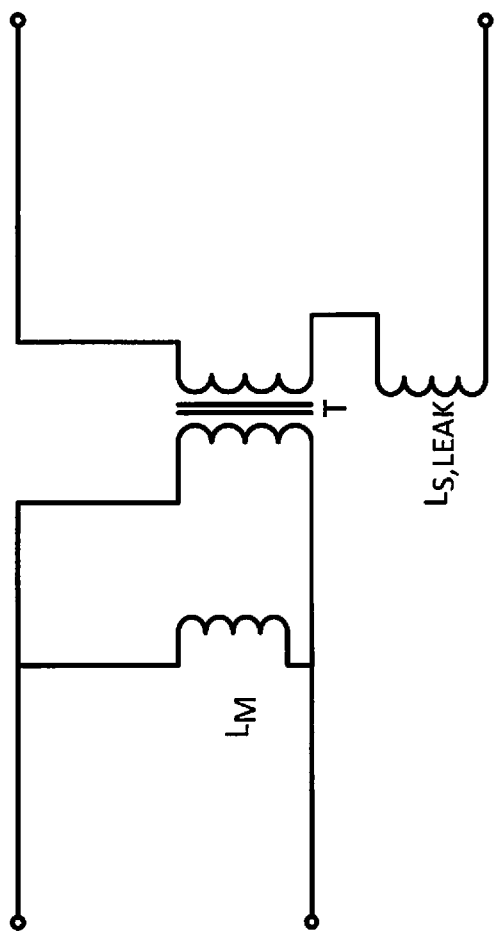
FIG. 1C is a schematic diagram illustrating a transformer's parasitic inductances.

Transformer 102' in FIG. 1B has been drawn as an ideal transformer with no parasitic elements. An actual transformer has a number of parasitic elements. Parasitic elements that could be exploited in the operation of a tapped forward boost converter are the transformer's magnetisation and leakage inductances. FIG. 1C is a schematic diagram illustrating a transformer's parasitic inductances, including the location of the magnetisation and leakage inductances. The magnetisation inductance $L_M$ is across or in parallel with the primary transformer winding. The current drawn by $L_M$ represents the current required to magnetise the transformer's core. Transformers are normally designed to maximize the value of $L_M$ since the greater the value of $L_M$, the smaller the required magnetisation current. In a tapped forward boost converter however, a small value of $L_M$ could be useful in storing energy during part of the converter cycle.

$L_M$ may therefore be deliberately decreased in the tapped forward boost converter to increase the energy storage capacity of the transformer. In this respect it is similar to a conventional flyback DC to DC converter. In one embodiment $L_M$ is decreased by inserting a small air gap into the transformer core to increase its reluctance and increase its magnetisation current. In some embodiments of a tapped forward boost converter, the transformer's magnetisation inductance is sufficiently small that no external storage inductor is required, thereby reducing the number of discrete components. Thus, in some embodiments, storage inductance 114 in FIG. 1B is the intrinsic or magnetisation inductance of the transformer 102' and is not an external discrete inductor.

Another parasitic transformer element that could be useful in a tapped forward boost converter is the transformer's parasitic leakage inductance. Leakage inductance results from the imperfect coupling of magnetic flux between the primary and secondary windings. The leakage inductance of a transformer is typically much smaller than its magnetisation inductance. The leakage inductance is represented in FIG. 1C by inductance $L_{S,LEAK}$ in series with the secondary winding of the transformer. Alternatively and equivalently the leakage inductance could have been shown as an inductance in series with the primary winding. Transformer leakage inductance is normally considered to be an undesirable parasitic component. In a tapped forward boost converter however, leakage inductance could be advantageously used in series with resonant capacitance 116 to transfer energy. In some embodiments the transformer's leakage inductance is sufficiently large that no external resonant inductance is required, thereby reducing the number of discrete components. Thus, in some embodiments resonant inductance 118 in FIG. 1B is the inherent leakage inductance of the transformer 102' and is not an external discrete inductor.

With reference again to FIG. 1B, switches 104, 120 and 122 may be implemented in a variety of ways, including power MOSFETs (Metal Oxide Semiconductor Field Effect Transistors), BJTs (Bipolar Junction Transistors), IGBTs (Insulated Gate Bipolar Transistors), junction diodes, and/or mechanical relays, for example. In the case of controllable switches, the opening and closing of switches 104, 120 and 122 may be controlled by a control means which is not shown.

The example converter 101 illustrated in FIG. 1B is bi-directional. Depending on the operation of switches 104, 120 and 122, power may be supplied to terminal pair 106, 108 and output two terminal pair 110, 112 or alternatively, power can be supplied to terminal pair 110, 112 and output to terminal pair 106, 108. The presence of capacitance 124 and capacitance 126 is dependent on the direction of power flow in the example converter 101. For instance, if the example converter 101 were to only operate with terminal pair 106, 108 as the input then capacitance 126 might be unnecessary. Similarly if the example converter 101 were to only operate with terminal pair 110, 112 as the input then capacitance 124 might be unnecessary. In practical implementations, however, it is expected that a capacitance 124, 126 would be coupled across each terminal pair 106, 108 and 110, 112. Capacitance across the input terminal pair, which could be 106, 108 or 110, 112 as noted above, need not necessarily be provided in a converter circuit, but could instead be in the form of a capacitance across the output terminals of a voltage source, for example.

Figure 2:
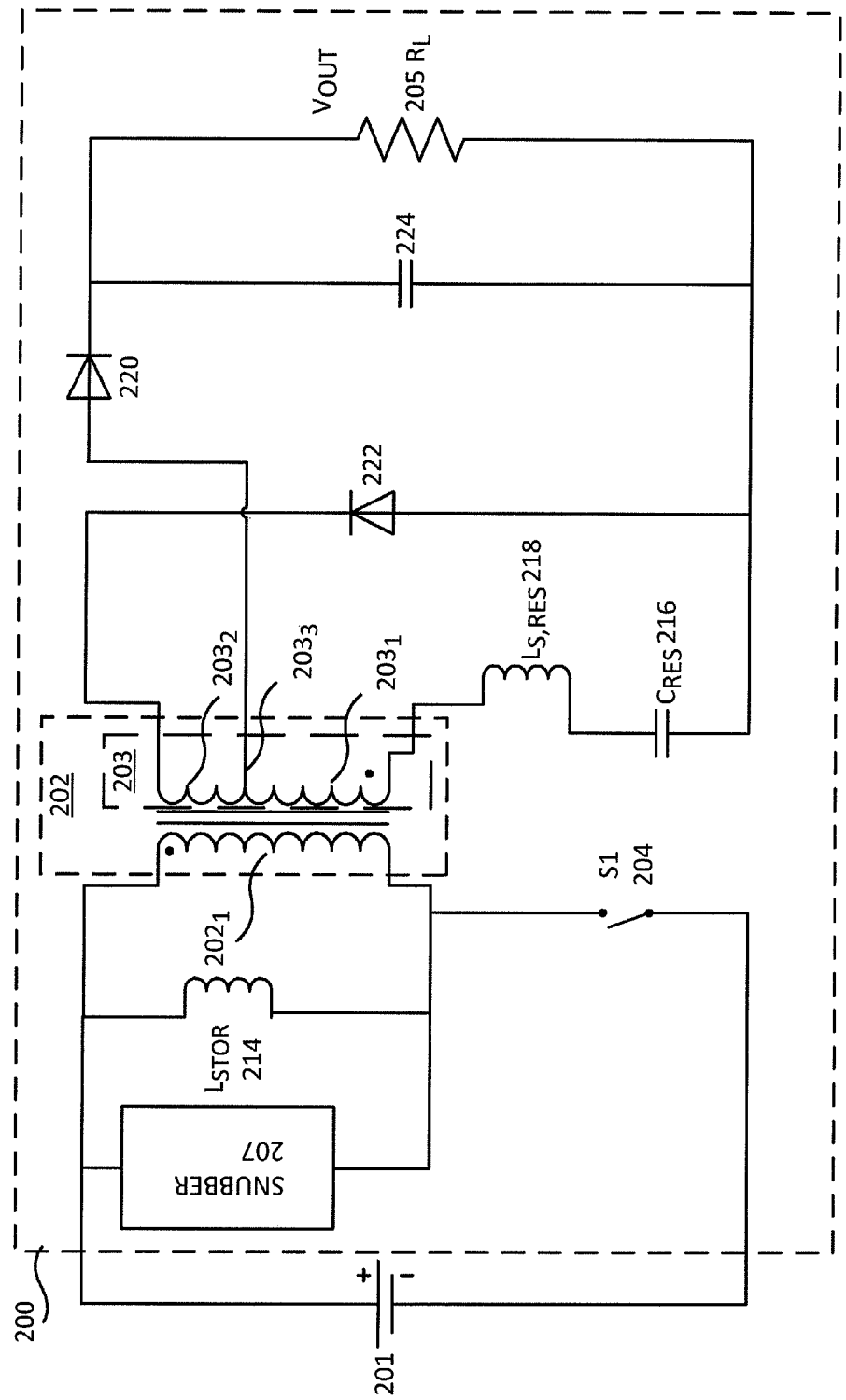
FIG. 2 is a schematic diagram illustrating an example tapped forward boost converter using an anti-phase transformer.

FIG. 2 is a schematic diagram illustrating an example tapped forward boost converter using an anti-phase transformer and diode switches. In the example converter 200 in FIG. 2, the primary-side terminals (106 and 108 in FIG. 1B) are the input terminals and the secondary-side terminals (110 and 112 in FIG. 1B) are the output terminals. Input voltage source 201 of value $V_{IN}$ is applied to the input terminals and load resistance 205 of value $R_L$ is coupled across the output terminals. In this embodiment, the switching elements 120 and 122 (FIG. 1B) are implemented as diodes 220 and 222 respectively.

Transformer 202 comprises primary winding $202_1$ and secondary winding 203. Secondary winding 203 is divided by tap connection $203_3$ into first portion $203_1$ and second portion $203_2$. Transformer 202 has a "transformer turns ratio" of N, where N is the ratio of the number of turns in secondary winding 203 to the number of turns in primary winding $202_1$. Transformer 202 has a "tapped turns ratio" of $N_T$, where $N_T$ is the ratio of the number of turns in first portion of secondary winding $203_1$ to the number of turns in primary winding $202_1$. In one embodiment $N_T$ has a value that is ¾ of the value of N, although this value could be different in other embodiments.

Using standard notation, the polarity of each winding of the transformer 202 is indicated by the black dots in FIG. 2. In the example embodiment shown in FIG. 2 the windings of the transformer 202 are arranged in anti-phase. However, in another embodiment, the windings could be arranged in phase. Although the transformer 202 is shown in FIG. 2 as a magnetic core transformer, in another embodiment it could be an air core transformer. In an embodiment of the example converter 200, storage inductance 214 consists entirely of the intrinsic magnetisation inductance of transformer 202 and there is no external storage inductance, and resonant inductance 218 consists entirely of the intrinsic leakage inductance of transformer 202 of value $L_{S,LEAK}$ and there is no external resonant inductance.

There is optionally a "snubber" circuit 207 coupled across the primary winding $202_1$ of transformer 202. The snubber circuit 207 is designed to limit the voltage stress on primary switch 204 when it switches open (OFF). High voltages can be created across primary switch 204 from the interruption of the current flowing in the storage inductance 214 when the switch opens. The snubber circuit 207 provides a current path when switch 204 opens and limits the voltages across the switch 204. Snubber circuits can be implemented in a variety of ways.

As shown, the example converter 200 also includes storage capacitance 224.

Figure 3:
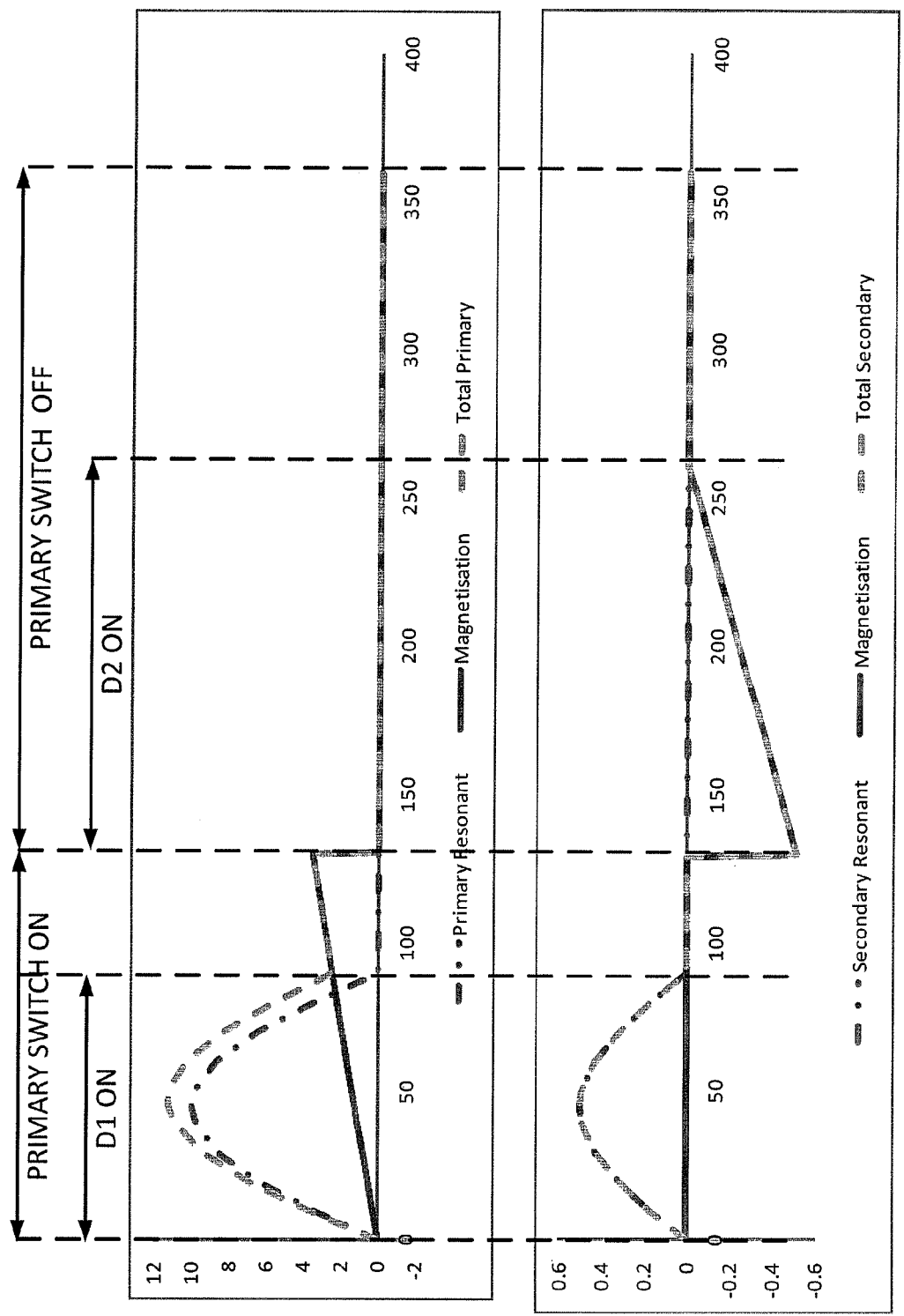
FIG. 3 is a current versus time graph illustrating resonant and storage current waveforms in the primary and secondary windings for the example tapped forward boost converter 200 in FIG. 2.

FIG. 3 is a current versus time graph illustrating resonant and storage current waveforms in the primary and secondary windings for the example tapped forward boost converter 200 in FIG. 2. FIG. 3 depicts components of currents in the primary and secondary windings of transformer 202 for a complete cycle of operation of example converter 200. FIG. 3 is intended to illustrate general waveform shapes, and units of current and time are arbitrary.

At time t=0 under steady load conditions, output capacitance 224 will have been previously charged to a voltage of value $V_{OUT}$ and resonant capacitance $C_{RES}$ 216 will have been previously charged to a voltage slightly below $V_{IN}*N_T$ where $V_{IN}$ is the input voltage and $N_T$ is the tapped turns ratio of transformer 202. $V_{IN}$ and $N_T$ are selected, for the purposes of illustration, such that their product is less than $V_{OUT}$ and diode 220 is therefore reverse biased and non-conducting. In one embodiment $V_{IN}*N_T$ is selected to be about 70% of $V_{OUT}$. Diode 222 is also reverse biased by the voltage across resonant capacitance $C_{RES}$ 216. The core of the transformer 202 will have been previously demagnetised so the currents in the primary and secondary windings of transformer 202 are both zero.

At time t=0 primary switch 204 is switched "ON" and closes to begin its conduction period, and the current in primary winding $202_1$ ($I_P$) begins to increase from zero. As shown in FIG. 3 there are two components to the primary current. A first component, $I_{P1}$, shown in FIG. 3 as "Magnetisation", is the storage current flowing through storage inductance $L_{STOR}$ 214 and increases linearly with time (t). This current flows though the magnetisation inductance of the transformer 202 and serves to magnetise the core of transformer 202. The storage current creates no corresponding current in the secondary winding or energy transfer to the output side of the circuit. The storage current ($I_{P1}$) is given by the formula:

$$I_{P1} = \frac{V_{IN} t}{L_{STOR}}.$$

The magnetic energy $E_{MAG}$ stored in an inductance of value L carrying current i is given by the equation:

$$E_{MAG} = \frac{Li^2}{2}$$

Hence, the energy ($E_{MAG}$) stored in the storage inductance $L_{STOR}$ 214 at the end of the conduction period of primary switch 204 ($t_{ON}$) is:

$$E_{MAG} = \frac{t_{ON}^2 V_{IN}^2}{2 L_{STOR}}.$$

A second component of the primary current ($I_{PR}$), shown in FIG. 3 as "Primary Resonant", is due to the resonant LC circuit on the secondary side of the transformer 202, consisting of resonant capacitance 216 coupled in series with resonant inductance 218. When primary switch 204 closes, a voltage of $V_{IN}$ appears across the primary winding $202_1$ of transformer 202, creating a voltage of magnitude $V_{IN}*N$, but of opposite polarity, across secondary winding 203. The voltage is sufficiently larger than the voltage stored in resonant capacitor 216 to forward bias diode 222. Diode 222 then begins its conduction period and provides a path for current to flow through secondary winding 203, resonant capacitance 216 and resonant inductance 218. Diode 220 remains reverse biased.

Figure 4:
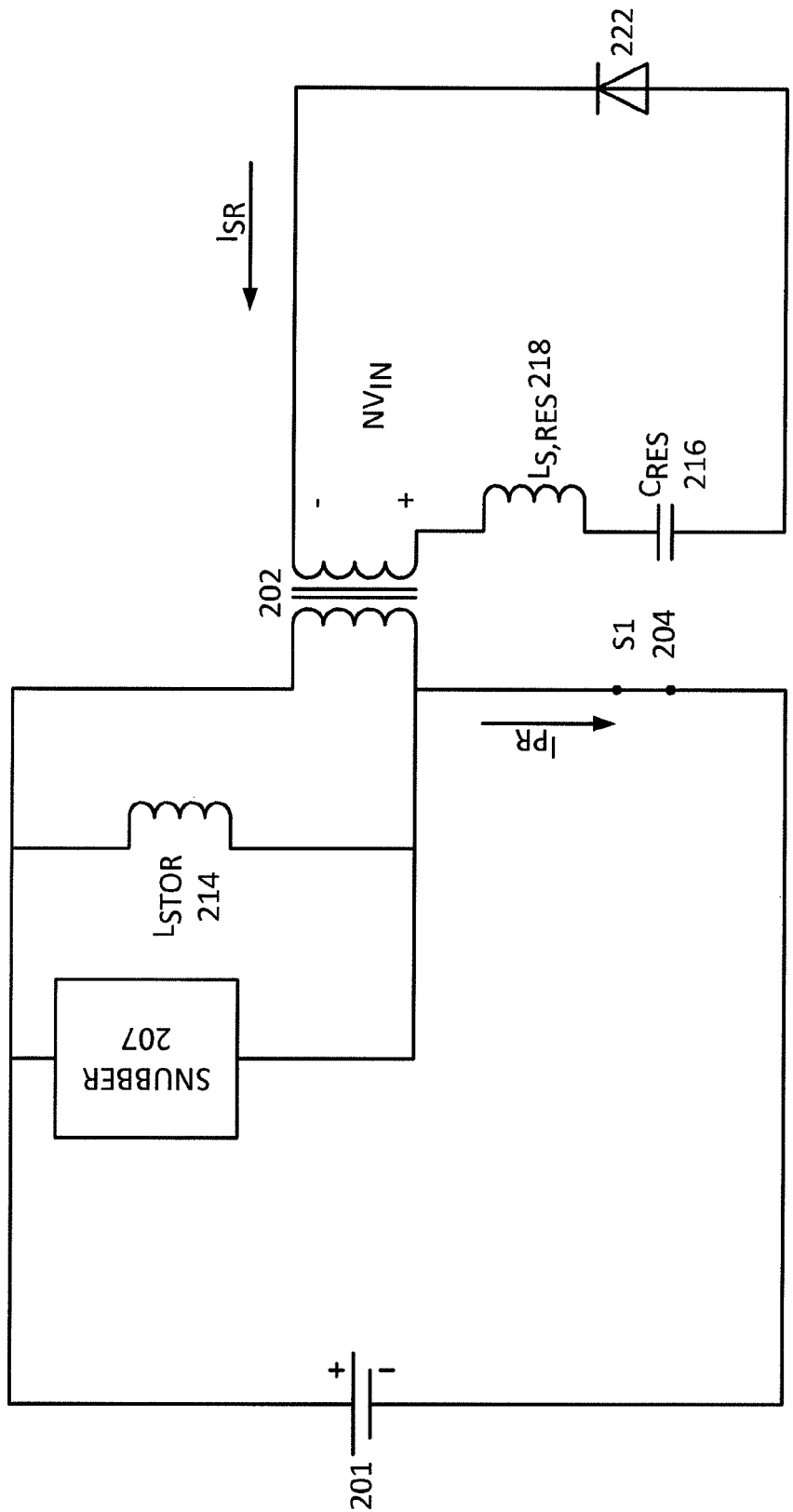
FIG. 4 is a schematic diagram illustrating an equivalent circuit for the example tapped forward boost converter 200 in FIG. 2 while the primary switch 204 is closed.

FIG. 4 is a schematic diagram illustrating an equivalent circuit for the example tapped forward boost converter 200 in FIG. 2 while the primary switch 204 is closed.

This LC circuit comprising resonant inductance 218 and resonant capacitance 216 as shown in FIG. 4 has a resonant frequency $\omega_R$ given by the formula:

$$\omega_R = \frac{1}{\sqrt{L_{S,RES} C_{RES}}}$$

where $C_{RES}$ is the value of capacitance 216 and $L_{S,RES}$ is the value of inductance 218.

The resonant secondary current ($I_{SR}$), shown in FIG. 3 as "Secondary Resonant", charges capacitance 216, causing its voltage to increase by an amount $2*\Delta V$, equal to the time integral of the secondary current divided by the value of capacitance 216. Under steady load the voltage of capacitance 216 is symmetric around $V_{IN}*N$, and thus its voltage at the beginning of the cycle is $V_{IN}*N-\Delta V$.

The resonant secondary current $I_{SR}$ is a time varying partial sinusoid given by the formula:

$$I_{SR} = \Delta V \sqrt{\frac{C_{RES}}{L_{S,RES}}} \sin(\omega_R t).$$

This resonant secondary current $I_{SR}$ is mirrored in the primary winding $202_1$, producing the second component of primary current $I_{PR}$. The resonant primary current also has the form of a partial sinusoid and is given by the formula:

$I_{PR}=NI_{PEAK}\sin(\omega_R t).$

Resonant secondary current $I_{SR}$ can only flow while diode 222 is forward biased, hence both $I_{SR}$ and $I_{PR}$ are limited to at most a half cycle of the sinusoid as shown in FIG. 3. In practice the exact shape of the resonant primary current depends on the length of the conduction period of primary switch 204 ($t_{ON}$), set by a switching control means. If the conduction period is longer than the half period of the sinusoid (T/2), then a full half cycle of primary and secondary resonant current will appear, as shown in FIG. 3. If the conduction period is less than T/2 only a portion of the half sinusoid would appear. The period of the sinusoid (T) is given by the formula:

$$T = \frac{2\pi}{\omega_R}.$$

Resonant capacitance 216 is sized such that its change in voltage is much less than its steady state voltage ($V_{IN}*N$). In one embodiment $V_{IN}*N$ is 300V and the change in voltage of resonant capacitance 216 is 6V.

The energy transferred into capacitance 216 during this half sinusoid charging cycle is proportional to $C_{RES}*\Delta V^2$. Thus the amount of energy transferred is independent of the value of resonant inductance 218. Smaller values of inductance 218 result in a narrower and higher half sinusoid pulse but the amount of energy transferred is the same. There are some practical limits, however. At very small values of resonant inductance 218 the current pulse will have such a large amplitude as to cause undesirable conduction losses. Therefore in some embodiments an external inductance may be advantageously added in series with the secondary winding 203 to add to the transformer's leakage inductance and increase the value of the resonant inductance 218 and reduce the peak of the current pulse.

At very large values of resonant inductance 218 the width of the half sinusoid will be so long that it will not complete before primary switch 204 is opened to end its conduction period. This could cause switching losses in diode 222 since diode 222 will still be conducting when primary switch 204 opens.

From the above analysis it will be apparent that the current in the primary winding $202_1$ of the transformer 202 during the conduction phase of primary switch 204 is the superposition of a linear ramp due to the storage inductance and a half sinusoid due to the LC resonant circuit as shown in FIG. 3.

Energy is stored in the storage inductance $L_{STOR}$ 214 and in the resonant capacitance 216 during the conduction phase of primary switch 204. When switch 204 opens the previously stored energy is transferred into load 205 and output capacitance 224.

When switch 204 opens, the current in the primary winding $202_1$ falls to substantially zero and energy stored in storage inductance 214 and resonant capacitance 216 begins to be transferred into load 205 and output capacitance 224. The effect of storage inductance 214 can be modeled as an equivalent inductance $L'_{STOR}$ of value $N_T^2*L_{STOR}$ in the output circuit. When switch 204 opens the voltage across $L'_{STOR}$ rises sufficiently to forward bias diode 220 and begin its conduction period, to thereby allow current to flow into load 205 and capacitance 224. Diode 222 becomes reverse biased to end its conduction period. Ideally, no primary current flows since switch 204 is open.

Figure 5:
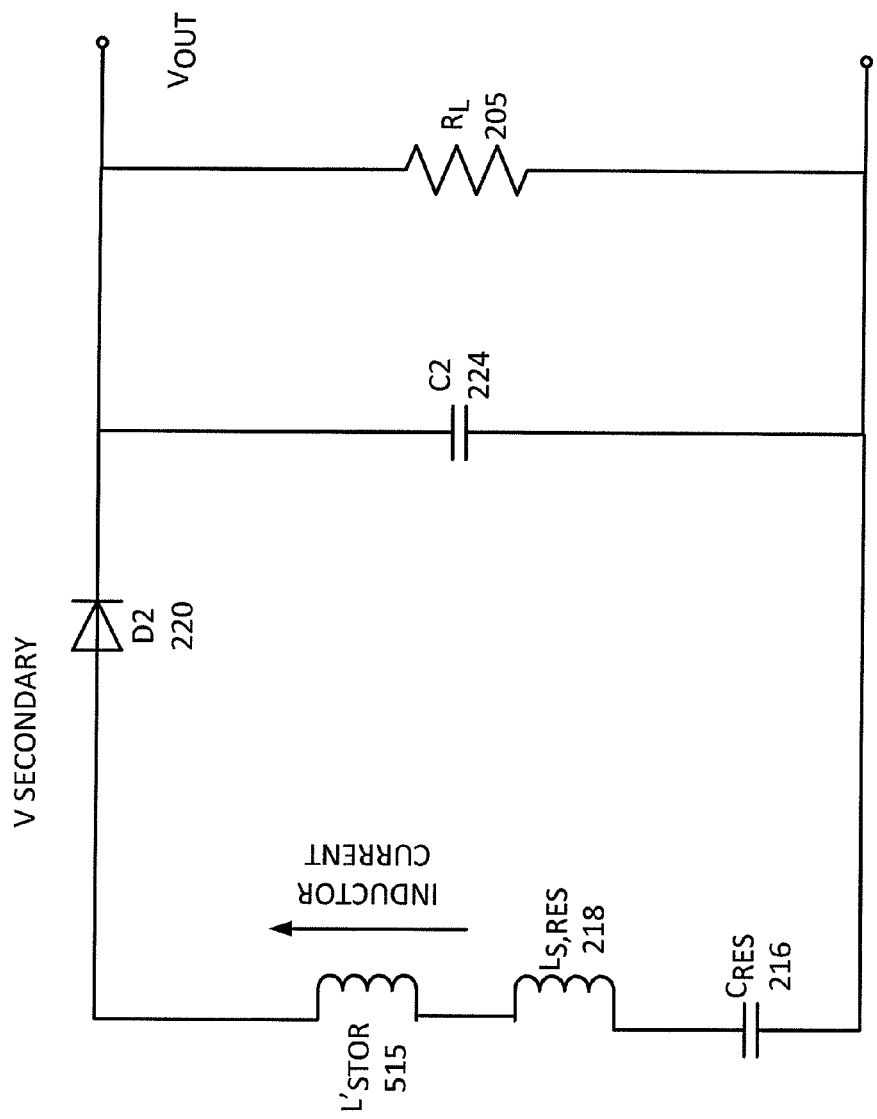
FIG. 5 is a schematic diagram illustrating an equivalent circuit for the example tapped forward boost converter 200 in FIG. 2 when the primary switch 204 opens.

FIG. 5 is a schematic diagram illustrating an equivalent circuit for the example tapped forward boost converter 200 in FIG. 2 when the primary switch 204 opens. As noted above, $L'_{STOR}$ 515 represents an equivalent inductance that models the effect of storage inductance $L_{STOR}$ 214.

Output capacitance 224 is sized relative to inductance $L'_{STOR}$ 515 such that the output voltage of the converter $V_{OUT}$ will not change significantly. Therefore, the voltage on that side of inductance $L'_{STOR}$ 515 is effectively clamped to a diode drop above $V_{OUT}$. Similarly the other side of inductance $L'_{STOR}$ 515 is clamped to about $V_{IN}*N$ by capacitance $C_{RES}$ 216, resulting in a voltage of about $V_{OUT}-V_{IN}*N$ across inductance $L'_{STOR}$ 515. This voltage is mirrored across to primary winding $202_1$, creating a voltage of $(V_{OUT}-V_{IN}*N)/N_T$ across it.

The secondary winding current waveform is shown in FIG. 3. With primary switch 204 open the secondary winding current decreases approximately linearly to zero as the energy stored in inductance $L'_{STOR}$ 515 is transferring into capacitance 224 and load 205. The core of transformer 202 is also demagnetizing during this operation. The voltage of resonant capacitance $C_{RES}$ 216 also decreases to $V_{IN}*N-\Delta V$ as its stored energy is transferred into load 205 and output capacitance 224 by the current in inductance $L'_{STOR}$ 515, creating an additional "boost" of energy. It should be noted that the equivalent circuit in FIG. 5 contains a series LC resonance consisting of inductance $L'_{STOR}$ 515, resonant inductance $L_{S,RES}$ 218 and resonant capacitance $C_{RES}$ 216. However, since the value of inductance $L'_{STOR}$ 515 is so much larger than the value of resonant inductance $L_{S,RES}$ 218 the resonant behavior cannot be seen on the time scale shown in FIG. 3, and the current waveform appears to be linear.

Once the core of transformer 202 is completely demagnetised, secondary current flow ceases and diode 220 becomes reverse biased, to end its conduction period, while diode 222 remains reverse biased.

Figure 6:
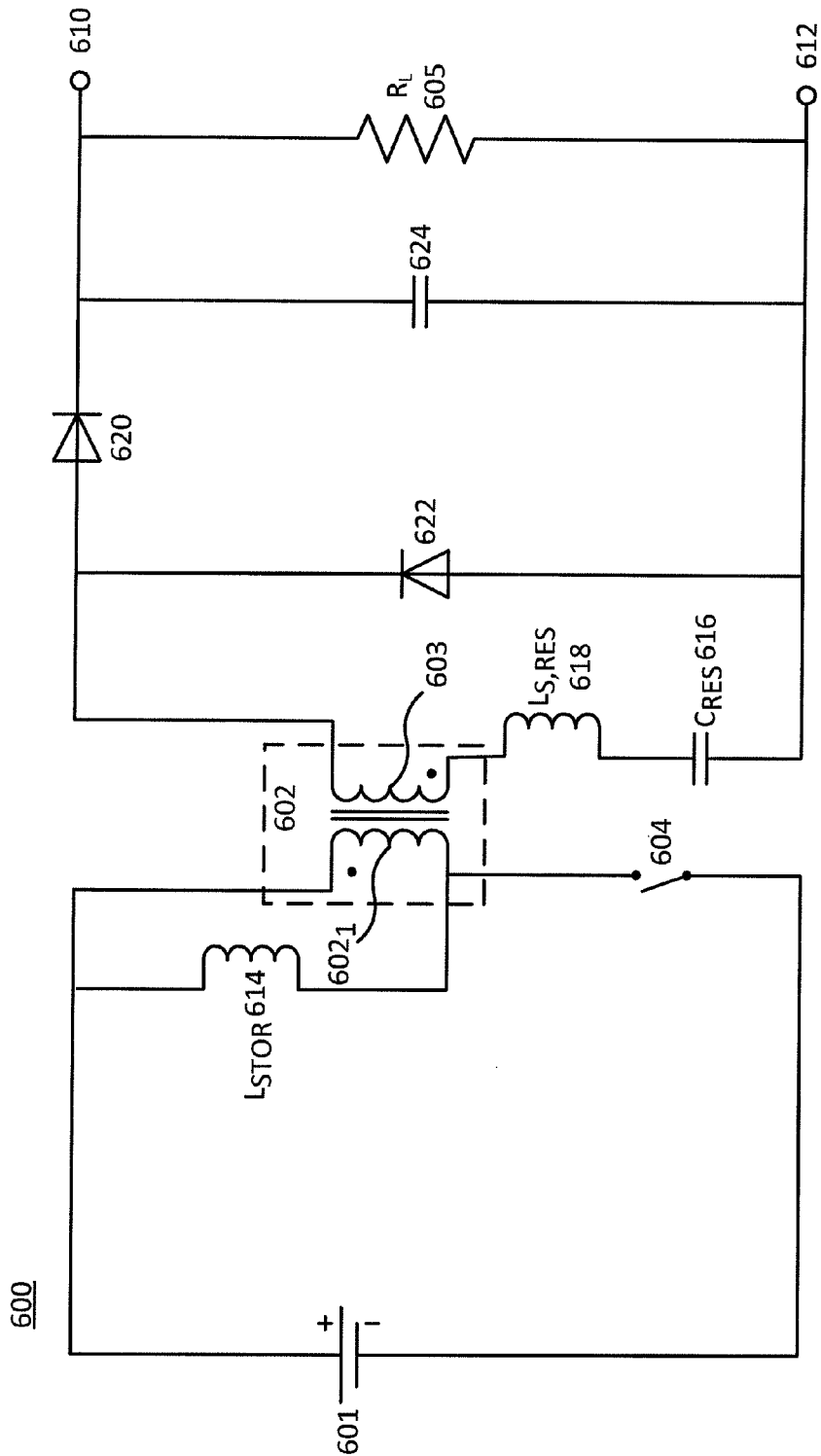
FIG. 6 is a schematic diagram of an example forward boost converter with diode switches.

FIG. 6 is a schematic diagram of an example forward boost converter with diode switches. Example forward boost converter 600 is coupled to input source 601 and comprises transformer 602, storage inductance 614, primary switch 604, resonant capacitance 616, resonant inductance 618, diodes 622 and 620, output capacitance 624 and load resistance 605. Transformer 602 comprises primary winding $602_1$ and secondary winding 603. The operation of forward boost converter 600 is conceptually similar to tapped forward boost converter 200 of FIG. 2 and includes a half sinusoidal resonance of resonant capacitance 616 and resonant inductance 618 when primary switch 604 is closed. However, tapped forward boost converter 200 could have an advantage over the example forward boost converter 600, at low input power for example.

In a forward boost converter 200, 600 the "ON" time of primary switch 204, 604 is generally proportional to power transferred from input to output. At low power however, the "ON" time of primary switch 604 could be less than the time for the resonant current to complete a half sinusoid and for diode 622 to become reverse biased. The time to complete a half sinusoid is just half of the resonant sinusoid period which is $$\pi\sqrt{L_{S,RES}C_{RES}}.$$

If the sinusoid does not complete before primary switch 604 turns off there could be undesirable power losses in diode 624. Therefore example forward boost converter 600 could have undesirable power losses at low input power.

The power transferred into load 205, 605 in a forward boost converter 200, 600 when primary switch 204, 604 is open is, however, proportional to the voltage across primary winding $202_1$, $602_1$.

The voltage across primary winding $602_1$ of transformer 602 in example forward boost converter 600 of FIG. 6 when primary switch 604 is open is $(V_{OUT}-V_{IN}*N)/N$. The voltage across primary winding $202_1$ of tapped forward converter 200 when primary switch 204 is open is, however, $(V_{OUT}-V_{IN}*N)/N_T$. Since $N_T<N$ the primary winding voltage in the tapped forward boost converter 200 can be higher than in the known forward boost converter 600 for the same values of $V_{IN}$ and $V_{OUT}$ by an appropriate choice of $N_T$ relative to N.

If the voltage of primary winding $202_1$ is increased relative to the voltage of primary winding $602_1$ the power transferred into load 205 relative to the power transferred into load 605 will also be increased. The "OFF" time of primary switch 204 in tapped forward boost converter 200 can therefore be reduced relative to the "OFF" time of primary switch 604 in the known forward boost converter. Similarly, the "ON" time of switch 204 can be increased relative to the "ON" time of switch 604 for the same power level. The increased "ON" time of primary switch 204 in tapped forward boost converter 200 could allow more time for the resonant half sinusoid to complete and thereby avoid losses in diode 222. Tapped forward boost converter 200 could therefore have improved low power performance relative to known forward boost converter 600.

In-Phase Transformer

Figure 7:
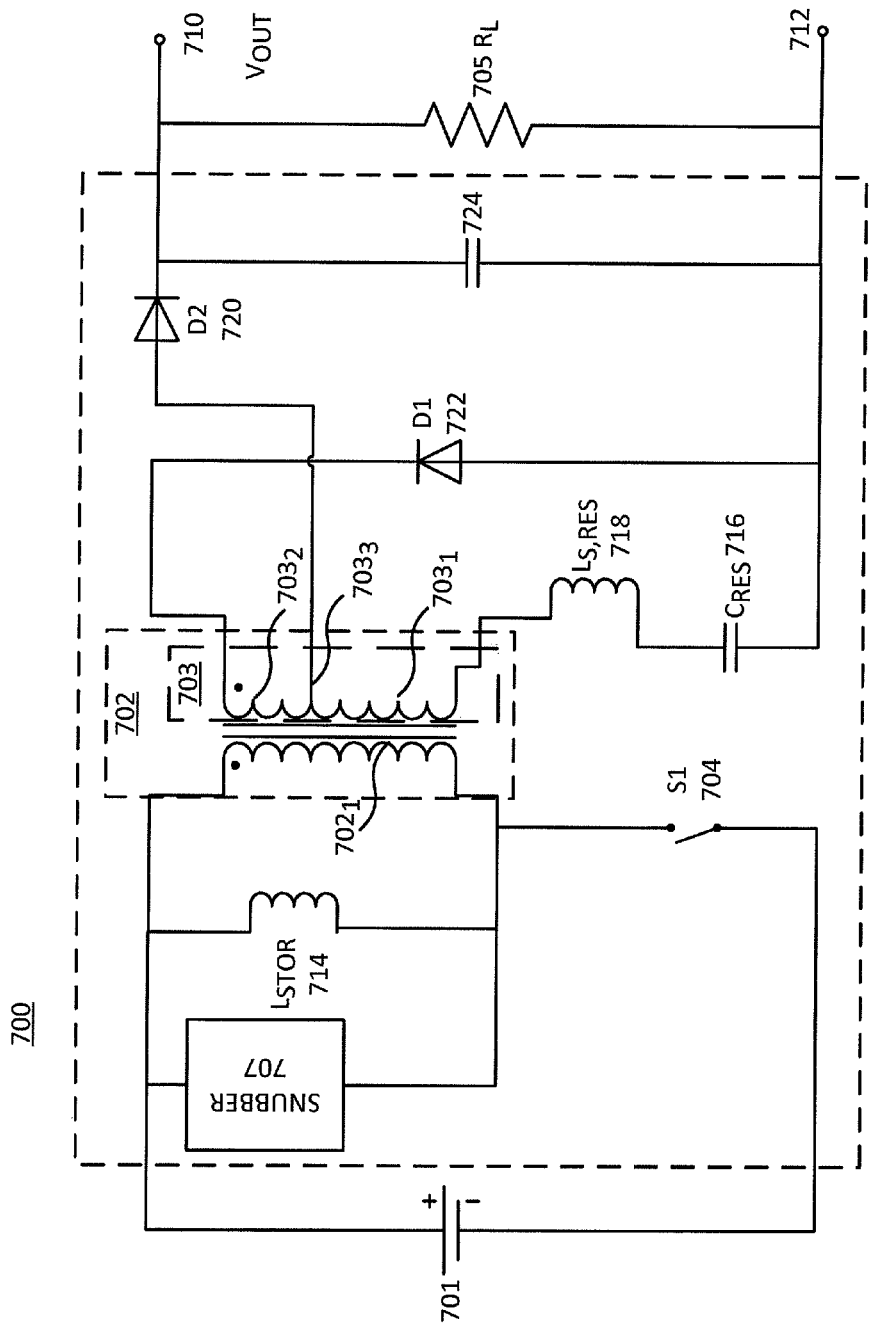
FIG. 7 is a schematic diagram illustrating an example tapped forward boost converter using a transformer with in-phase windings.

The tapped forward boost converter design is not restricted to the use of transformers with anti-phase windings. FIG. 7 is a schematic diagram illustrating an example tapped forward boost converter circuit 700 using a transformer with in-phase windings. Input voltage source 701 of value $V_{IN}$ is applied to the input terminals and load resistance 705 is connected to the output terminals 710, 712. In this example transformer 702 is a magnetic core transformer and storage inductance $L_{STOR}$ 714 could consist entirely of the magnetisation inductance of transformer 702 and there is no external storage inductor. Also in this example, resonant inductance $L_{S,RES}$ 718 could consist entirely of the intrinsic leakage inductance of transformer 702 of value $L_{S,LEAK}$ and there is no external resonant inductor. Like example tapped forward boost converter 200 in FIG. 2, the example tapped forward boost converter 700 also includes a primary switch 704, resonant capacitance $C_{S,RES}$ 716, diodes 720, 722, and output capacitance 724, operatively coupled together as shown.

Transformer 702 comprises primary winding $702_1$ and secondary winding 703. Secondary winding 703 is divided by tap connection $703_3$ into first portion $703_1$ and second portion $703_2$.

Transformer 702 has a "transformer turns ratio" of N, where N is the ratio of the number of turns in secondary winding 703 to the number of turns in primary winding $702_1$. Transformer 702 has a "tapped turns ratio" of $N_T$, where $N_T$ is the ratio of the number of turns in the first portion of secondary winding $703_1$ to the number of turns in primary winding $702_1$. In one embodiment $N_T$ is chosen to be ¾ of the value of N. Other values of $N_T$ relative N are possible.

Secondary winding 703 is coupled to resonant capacitance 716 and resonant inductance 718. This series combination of secondary winding 703, resonant inductance 718, and resonant capacitance 716 is shunted by diode 722. The series combination of resonant capacitor 716, resonant inductance 718 and first portion of secondary winding $703_1$ connects to terminal 710 through diode 720, and connects to terminal 712. Storage capacitance 724 is coupled across terminals 710, 712.

The operation of the example tapped forward boost converter 700 is conceptually similar to the example tapped forward boost converter 200 in FIG. 2, which includes an anti-phase transformer. There is optionally a "snubber" circuit 707 coupled across primary winding $702_1$ to limit the voltage stress on primary switch 704 when it switches off.

In steady state load conditions, just prior to the closing of primary switch 704, output capacitance 724 is charged to a voltage of $V_{OUT}$ and resonant capacitance $C_{RES}$ 716 is charged to slightly below $V_{OUT}-V_{IN}*N_T$. Diode 720 is reverse biased and non-conducting. Diode 722 is also reverse biased and non-conducting and no current flows in the primary and secondary windings of transformer 702. When primary switch 704 closes to begin its conduction ("ON") period, current begins to flow in primary winding $702_1$. As in the previous embodiment, the primary current has two components, the storage current flowing in storage inductance $L_{STOR}$ 714 and a resonant current. The storage current serves to magnetise the core of transformer 702, but there is no corresponding current in the secondary winding and there is no energy transfer to the output side of the example converter 700. The storage current is approximately a linear time-dependent ramp.

When primary switch 704 closes, a voltage appears across the secondary winding of the transformer 702, forward biasing diode 720 to begin its conduction period. This contrasts with the previous tapped forward boost embodiment 200 of FIG. 2 in which diode 222 became forward biased on the closing of the primary switch. A resonant current flows in the LC resonant circuit composed of the series combination of the leakage inductance $L_{S,RES}$ 718, resonant capacitance $C_{RES}$ 716, and output capacitance 724.

Figure 8A:
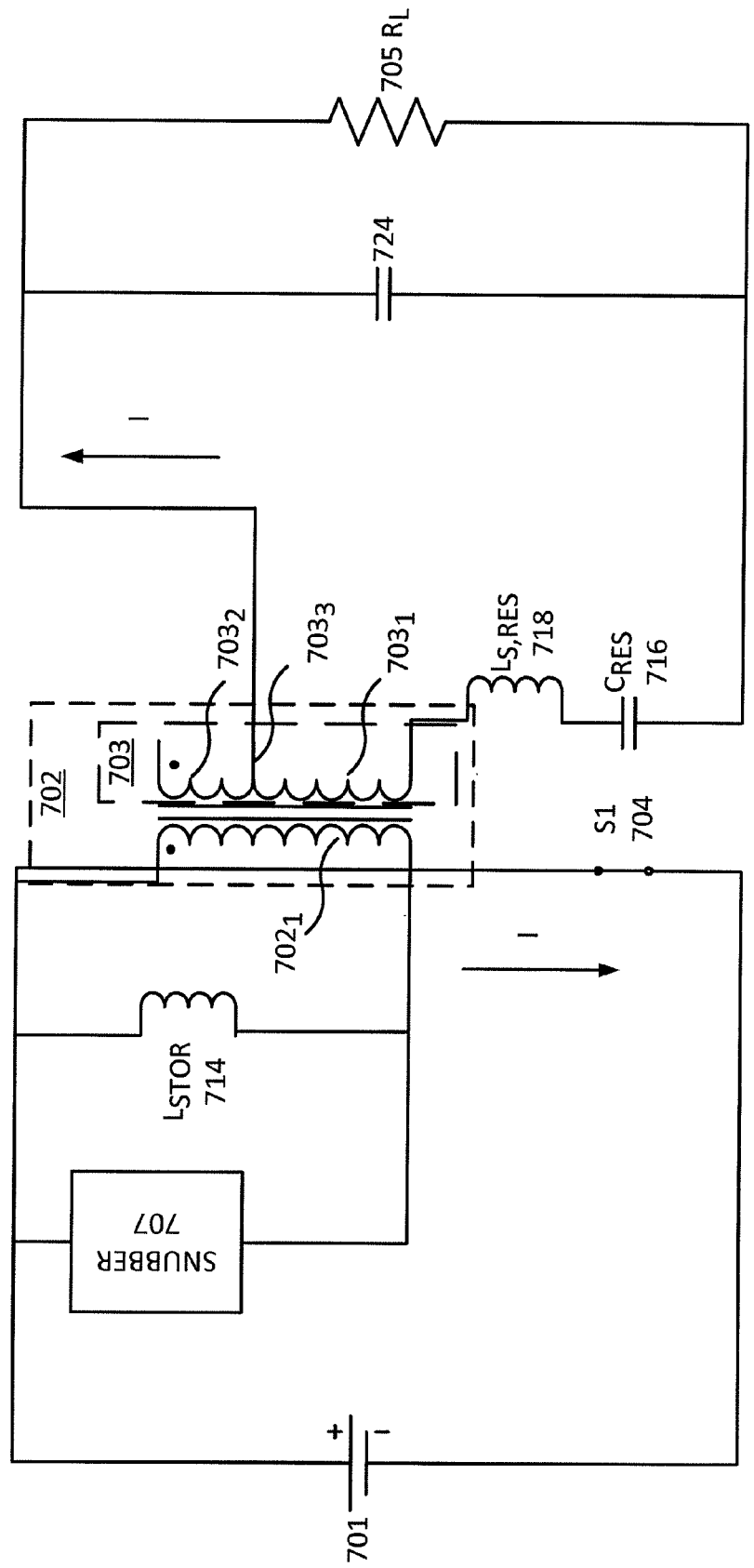
FIG. 8A is a schematic diagram illustrating an equivalent circuit for the example tapped forward boost converter 700 in FIG. 7 while the primary switch 704 is closed.

FIG. 8A is a schematic diagram of the equivalent circuit for the example tapped forward boost converter 700 in FIG. 7 while primary switch 704 is closed ("ON").

Unlike in the anti-phase embodiment (FIG. 2), output capacitance 724 is a part of the resonant circuit. Output capacitance 724, however, is chosen to be significantly larger than resonant capacitance $C_{RES}$ 716 such that the series combination of the two capacitances results in a total value of capacitance not much smaller than the value of $C_{RES}$ 716. In one embodiment capacitance $C_{RES}$ 716 has a value of 220 nF and output capacitance 724 has a value of 1 uF. As in the anti-phase case (FIG. 2), only a half sinusoid pulse of resonant current flows. Energy is therefore transferred into load 705 and output capacitance 724 from capacitance $C_{RES}$ 716 during the conduction period of the primary switch 704 in this configuration. This contrasts with the anti-phase configuration of the previous embodiment (FIG. 2) where energy was transferred into the load from capacitance $C_{RES}$ 216 during the non-conducting period of primary switch 204.

The storage current in the primary winding $702_1$ continues to flow until the primary switch 704 is opened to end its conduction period and the current in the primary winding falls to zero. The energy stored in the storage inductance $L_{STOR}$ 714 begins to be transferred into the secondary side.

Figure 8B:
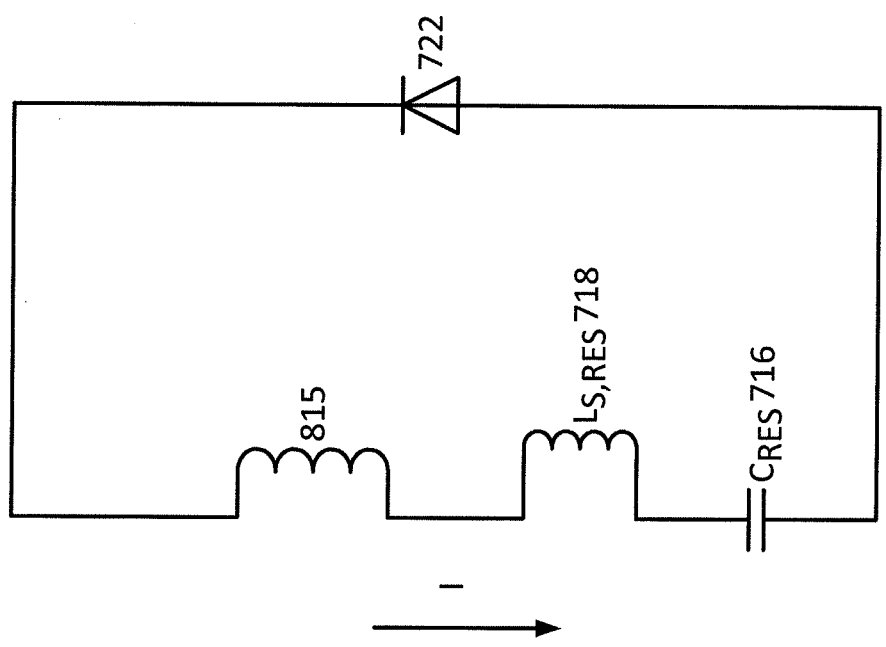
FIG. 8B is a schematic diagram of an equivalent circuit for example tapped forward boost converter 700 in FIG. 7 when the primary switch 704 opens.

FIG. 8B is a schematic diagram of an equivalent circuit for example tapped forward boost converter 700 in FIG. 7 when the primary switch 704 opens. The effect of the storage inductance $L_{STOR}$ 714 can be modeled as equivalent inductance 815 of value $N^2*L_{STOR}$ in the output circuit. When primary switch 704 opens, the voltage induced across equivalent inductance 815 is in the opposite direction to the voltage across resonant capacitance $C_{RES}$ 716 and slightly larger. It forward biases diode 722 to begin its conduction period, while diode 720 is reverse biased to end its conduction period.

The secondary winding current magnitude decreases almost linearly to zero as the energy stored in equivalent inductance 815 is transferring into resonant capacitance $C_{RES}$ 716. The core of transformer 702 is also demagnetizing during this operation. The voltage of resonant capacitance $C_{RES}$ 716 increases to slightly above $V_{OUT}-V_{IN}*N_T$ as it stores energy. It should be noted that while the equivalent circuit in FIG. 8B is a series LC resonant circuit the value of equivalent inductance $L'_{STOR}$ 815 is so large that the decrease in current is substantially linear.

When the core of the transformer 702 is completely demagnetised, secondary current flow ceases and diode 722 becomes reverse biased to end its conduction period.

This tapped forward boost topology using an in-phase transformer is conceptually similar to the tapped forward boost topology with anti-phase transformer and could have similar advantages, especially at low power.

Referring to FIG. 7, during the conduction period of switch 704 the voltage at tap $703_3$ is effectively clamped by capacitance 724 to $V_{OUT}$. The voltage at the other end of the first portion of secondary winding $703_1$ is similarly clamped to about $V_{IN}*N$. The voltage across primary winding $702_1$ is therefore $(V_{OUT}-V_{IN}*N)/N_T$.

Figure 9:
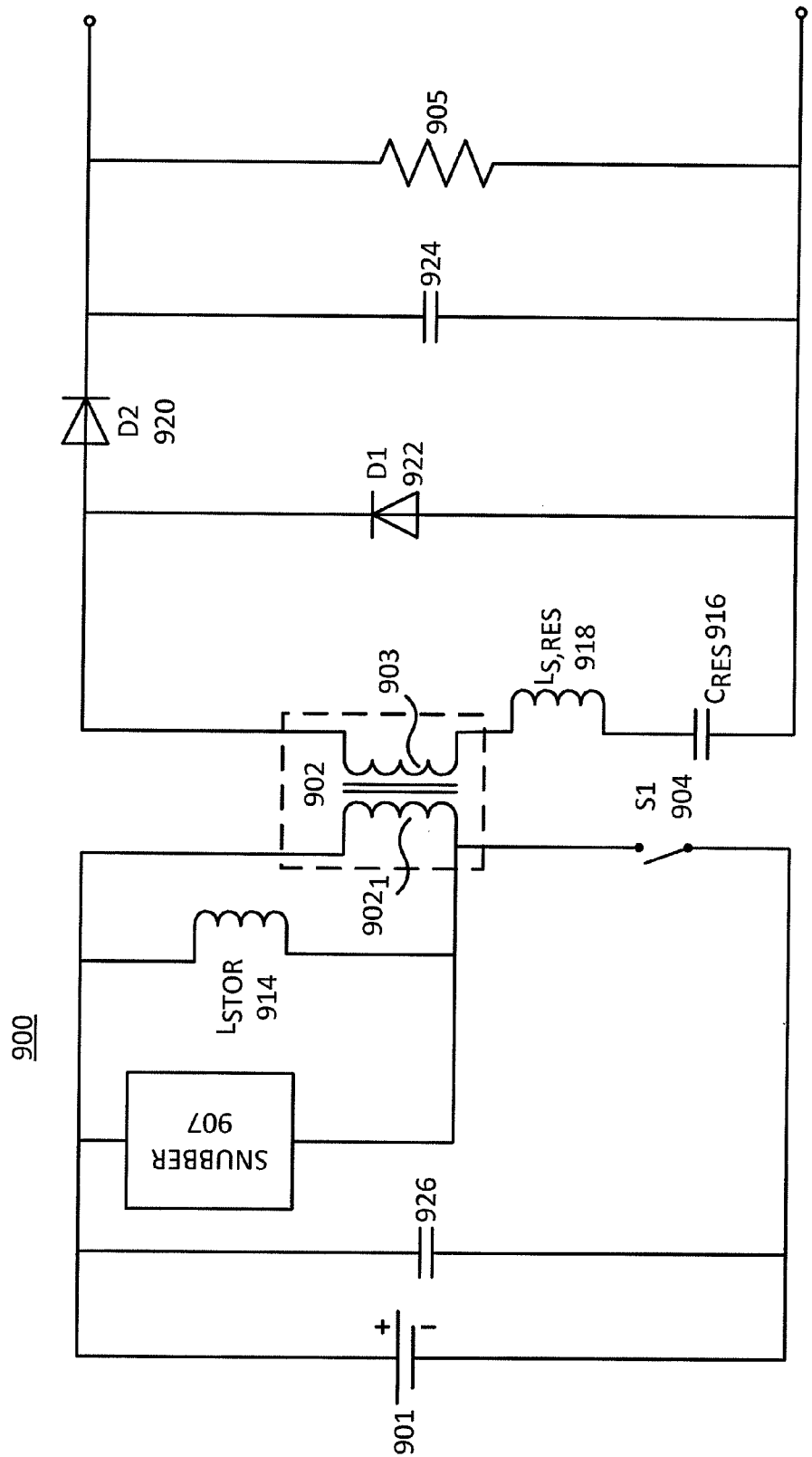
FIG. 9 is a schematic diagram of an example forward boost converter with an in-phase transformer.

FIG. 9 is a schematic diagram of an example forward boost converter with an in-phase transformer. Forward boost converter 900 is coupled to input source 901 and comprises input capacitance 926, snubber circuit 907, transformer 902, storage inductance 914, primary switch 904, resonant capacitance 916, resonant inductance 918, diodes 922 and 920, output capacitance 924 and load resistance 905. Transformer 902 comprises primary winding $902_1$ and secondary winding 903. The operation of forward boost converter 900 is conceptually similar to tapped forward boost converter 700 and includes a half sinusoidal resonance of resonant capacitance 916 and resonant inductance 918 when primary switch 904 is closed.

Tapped forward boost converter 700 could have an advantage at least at low input power over forward boost converter 900. Forward boost converter 900 using in-phase transformer 902 has the same difficulties at low power as forward boost converter 600 with anti-phase transformer 602, in FIG. 6. If the "ON" time of the primary switch 904 is too short then the resonant half sinusoid pulse will not have time to complete and diode 920 will still be conducting when primary switch 904 turns "OFF" leading to conduction losses in diode 920.

The power transferred into load 705, 905 in a forward boost converter 700, 900 when primary switch 704, 904 is open is, however, proportional to the voltage across primary winding $702_1$, $902_1$.

The voltage across primary winding $902_1$ in forward boost converter 900 is $(V_{OUT}-V_{IN}*N)/N$ when primary switch 904 is closed. The voltage in primary winding $702_1$ in tapped forward boost converter 700 is $(V_{OUT}-V_{IN}*N)/N_T$ when primary switch 704 is closed. Since $N_T<N$ the primary winding voltage in tapped forward boost converter 700 can be higher than in known forward boost converter 900 for the same values of $V_{IN}$ and $V_{OUT}$ by adjusting the value of $N_T$.

Similarly to the anti-phase case, if the voltage of primary winding $702_1$ in tapped forward boost converter 700 is increased relative to the voltage of primary winding $902_1$ in forward boost converter 900, the power transferred into load 705 relative to the power transferred into load 905 will also be increased. The "OFF" time of primary switch 704 in tapped forward boost converter 700 can therefore be reduced relative to the "OFF" time of primary switch 904 in forward boost converter 900. Similarly, the "ON" time of switch 704 can be increased relative to the "ON" time of switch 904 for the same power level. The increased "ON" time of primary switch 704 in tapped forward boost 700 could allow more time for the resonant half sinusoid to complete and thereby avoid losses in diode 720. Tapped forward boost converter 700 could therefore have improved low power performance relative to forward boost converter 900.

Reverse Operation

The ability to operate a power converter in reverse could be useful, for example, in applications involving combined electrical generation and storage such as batteries or fuel cells in which the storage will supply power for certain periods and consume power for other periods.

Figure 10:
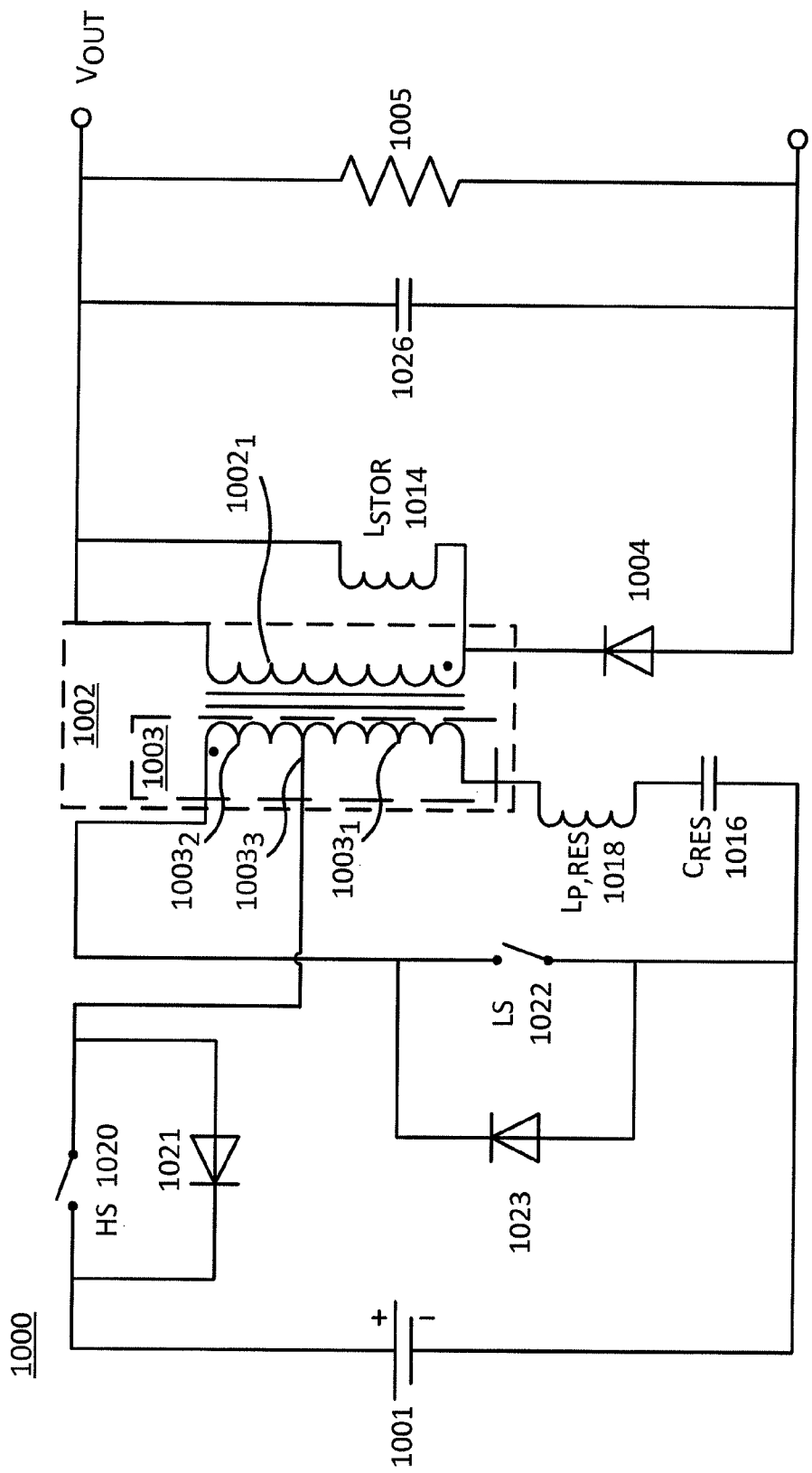
FIG. 10 is a schematic diagram illustrating an example tapped forward boost converter operated in the reverse direction to the example tapped forward boost converter 200 in FIG. 2.

FIG. 10 is a schematic diagram illustrating an example tapped forward boost converter operated in the reverse direction to the example tapped forward boost converter 200 in FIG. 2.

In the example converter 1000 in FIG. 10, terminals corresponding to 110 and 112 in FIG. 1B are the input terminals and terminals corresponding to 106 and 108 in FIG. 1B are the output terminals. Input voltage source 1001 of value $V_{IN}$ is applied to the input terminals and load resistance 1005 of value $R_L$ is coupled across the output terminals.

Transformer 1002 comprises primary winding 1003 and secondary winding $1002_1$. Primary winding 1003 is divided by tap connection $1003_3$ into first portion $1003_1$ and second portion $1003_2$. Transformer 1002 has a "transformer turns ratio" of 1/N, where N is the ratio of the number of turns in primary winding 103 to the number of turns in secondary winding $1002_1$. Transformer 102 has a "tapped turns ratio" of $1/N_T$, where $N_T$ is the ratio of the number of turns in the first portion of primary winding $1003_1$ to the number of turns in secondary winding $1002_1$.

Transformer 1002 is used with anti-phase windings and a magnetic core in the example shown, although an in-phase transformer, or an anti-phase or in-phase air core transformer might instead be used. In an embodiment, storage inductance $L_{STOR}$ 1014 consists entirely of the magnetisation inductance of transformer 1002 and there is no external storage inductor, and resonant inductance $L_{P,RES}$ 1018 consists entirely of the intrinsic leakage inductance of transformer 1002 with value $L_{S,LEAK}$ and there is no external resonant inductor.

In accordance with convention, the winding of transformer 1002 at the input side of the example tapped forward boost converter 1000 is referred to as the primary winding and the winding at the output side is referred to as the secondary winding. However, the example tapped forward boost converter 1000 illustrates reverse operation relative to the example tapped forward boost converter 200 in FIG. 2, and therefore storage inductance 114, which is the magnetisation inductance of transformer 1002, is shown at the output side winding in FIG. 10, and $L_{P,RES}$, which is the leakage inductance of transformer 1002, is shown at the input side winding.

Controllable high side switch 1020 and low side switch 1022 replace diodes 220/720, 222/722 in previous embodiments (200, 700), and diode 1004 replaces primary switch 204, 704 in previous embodiments (200, 700).

The example tapped forward boost converter 1000 also includes resonant capacitance $C_{RES}$ 1016 and output capacitance 1026, coupled together as shown. Resonant capacitance $C_{RES}$ 1016 is now located on the input side of the circuit rather than the output side, and resonates with resonant inductance $L_{P,RES}$ 1018. Diode 1004 performs a function similar to primary switch 204 in the example tapped forward boost converter 200, but is located on the output side of the example converter 1000. Although diode 1004 is used in this embodiment, another type of switching device such as a MOSFET or a relay could instead be used.

High side switch 1020 and low side switch 1022 perform functions similar to diodes 220 and 222 of the example converter 200. Switches 1020 and 1022 can be implemented in a variety of ways. In one embodiment, they are N type MOSFETs and bypass diodes 1021 and 1023 are the intrinsic diodes formed by the P-type body and N type drain of each MOSFET. Switches 1021 and 1022 are controlled by a control or switching means which is not shown.

FIG. 13 is a graph illustrating exemplary high side and low side switch drive voltages "Drive HS" and "Drive LS", respectively, and current waveforms for the high side switch 1020, low side switch 1022 and secondary winding for the example tapped forward boost converter 1000 in FIG. 10.

At the start of the operating cycle under steady state load conditions switches 1020 and 1022 are both open, output capacitance 1026 is charged to voltage $V_{OUT}$, resonant capacitance $C_{RES}$ 1016 is charged to about $V_{IN}-V_{OUT}*N_T$, diode 1004 is reverse biased and the core of transformer 1002 is demagnetised.

When switch 1020 is closed to begin its conduction period, input voltage source 1001 is connected across the first portion of primary winding $1003_1$. A current begins to flow through high side switch 1020 and a reflected voltage appears across secondary winding $1002_1$. No secondary current flows since transformer 1002 is anti-phase and keeps diode 1004 reverse biased.

Figure 11A:
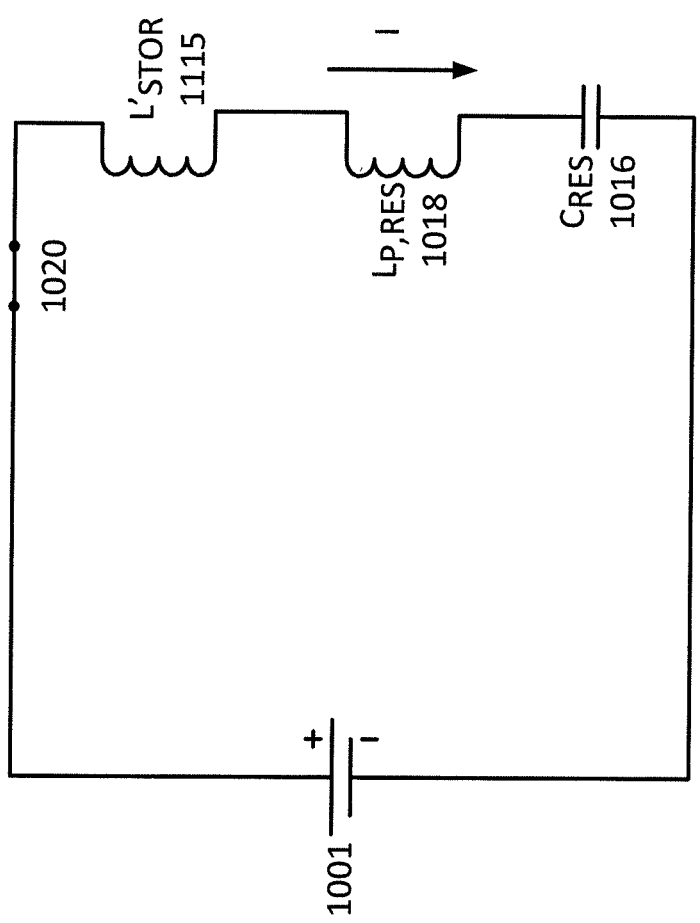
FIG. 11A is a schematic diagram illustrating an equivalent circuit for the example tapped forward boost converter 1000 in FIG. 10 while high side switch 1020 is closed.

FIG. 11A is a schematic diagram illustrating an equivalent circuit for the example tapped forward boost converter 1000 in FIG. 10 with high side switch 1020 closed. Reflected storage inductance $L'_{STOR}$ 1115 is in series with resonant inductance $L_{P,RES}$ 1018 and resonant capacitance $C_{RES}$ 1016. The value of the reflected storage inductance $L'_{STOR}$ 1115 is $N_T^2 L_{STOR}$. The primary current increases nearly linearly with time since the resonant frequency of the series combination of $L_{P,RES}$ 1018, $L'_{STOR}$ 1115 and $C_{RES}$ 1016 is low relative to the time scale of the switching. In one embodiment $L_{STOR}$ 1014 has a value of 7.2 uH, resonant capacitance 1216 has a value of 220 nF, resonant inductance 1018 is 90 nH, N is 9 and $N_T$ is ¾ of the value of N. This primary current charges resonant capacitance $C_{RES}$ 1016 and stores energy in the storage inductance $L_{STOR}$ 1014. No current flows in secondary winding $1002_1$ since diode 1004 is reverse biased.

Figure 11C:
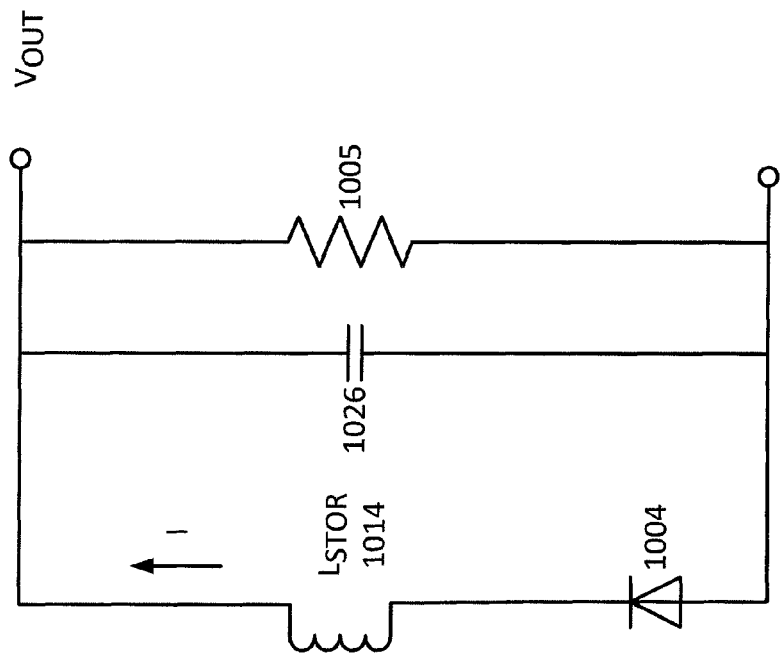
FIG. 11C is a schematic diagram illustrating an equivalent circuit for the output portion of the example tapped forward boost converter 1000 in FIG. 10 when high side switch 1020 opens.
Figure 11B:
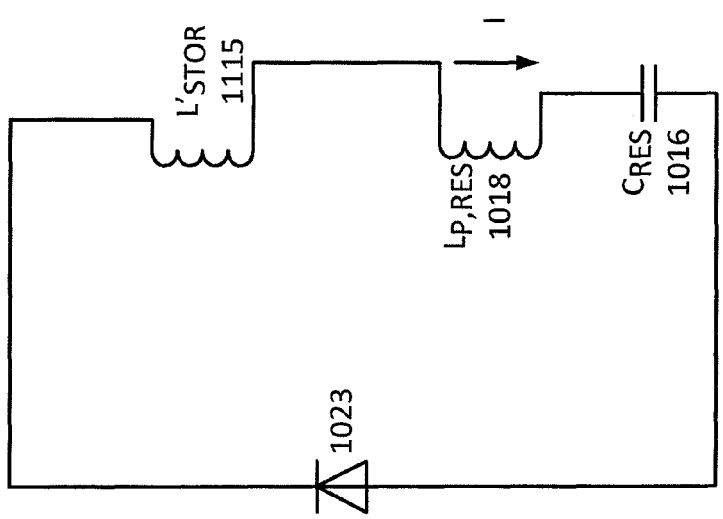
FIG. 11B is a schematic diagram illustrating an equivalent circuit for the input portion of the example tapped forward boost converter 1000 in FIG. 10 when high side switch 1020 opens.

When high side switch 1020 is opened to end its conduction period, the current through it stops and the energy stored in storage inductance 1014 begins to transfer to the output. FIG. 11B is a schematic diagram illustrating an equivalent circuit for the input portion of the example tapped forward boost converter 1000 in FIG. 10 when high side switch 1020 opens. The primary winding current does not fall immediately to zero since the diode 1023 across switch 1022 briefly provides a path for continued flow. This current appears as the small current spike in the low side switch current waveform in FIG. 13 co-incident with the falling edge of the DRIVE_HS voltage.

In the output portion of the example converter 1000, the voltage across storage inductance $L_{STOR}$ 1014 forward biases diode 1004 to begin its conduction period. FIG. 11C is a schematic diagram illustrating an equivalent circuit for the output portion of the example tapped forward boost converter 1000 in FIG. 10 when high side switch 1020 opens. Secondary current flows as storage inductance $L_{STOR}$ 1014 discharges into load 1005 and output capacitance 1026. The current flow decreases approximately linearly, as shown in FIG. 13.

Figure 11D:
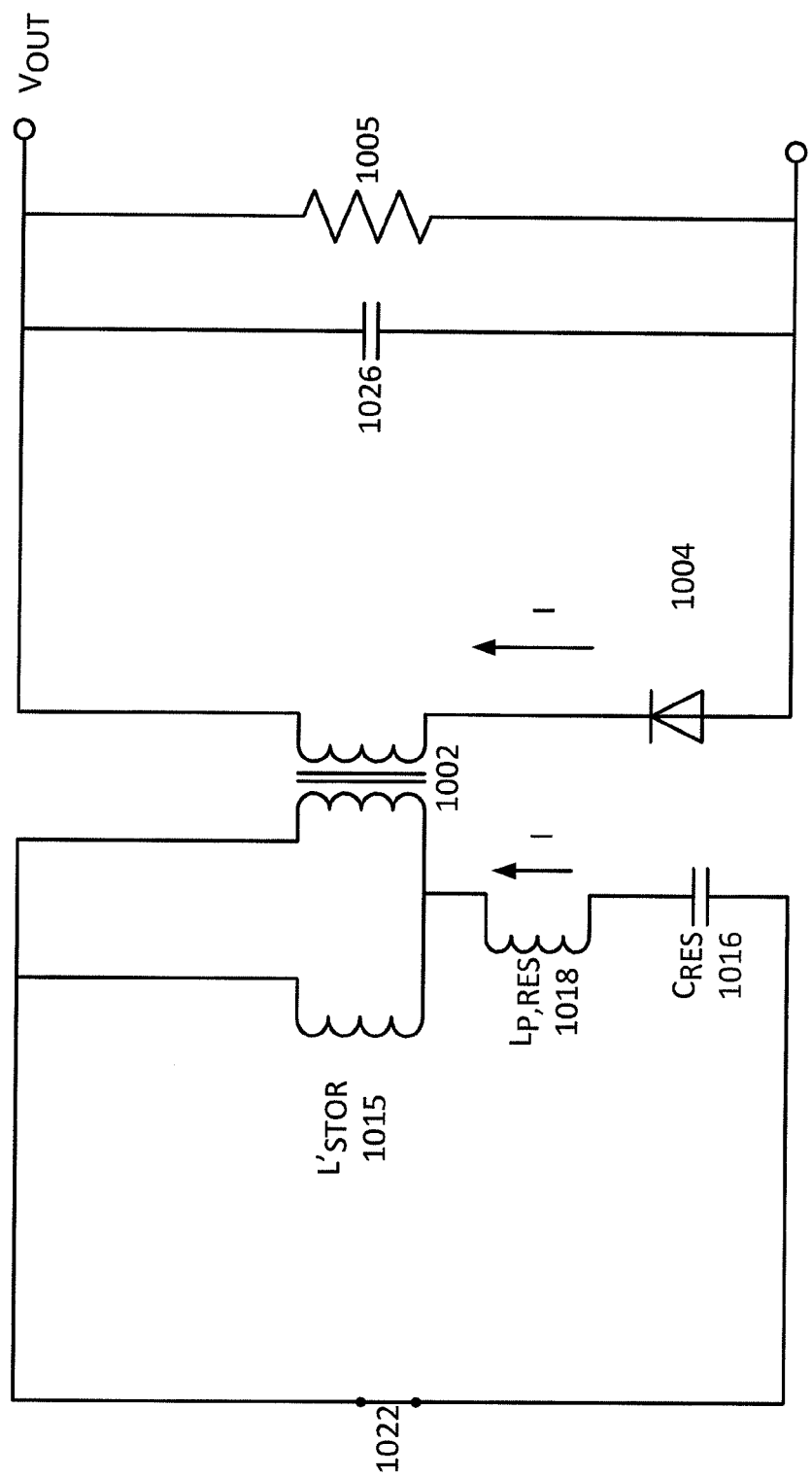
FIG. 11D is a schematic diagram illustrating an equivalent circuit for the input portion of the example tapped forward boost converter 1000 in FIG. 10 when the low side switch 1022 is closed.

After storage inductance $L_{STOR}$ 1014 has discharged, low side switch 1022 is closed to begin its conduction period, forming a series LC resonant circuit from resonant capacitance $C_{RES}$ 1016 and resonant inductance $L_{P,RES}$ 1018. FIG. 11D is a schematic diagram illustrating an equivalent circuit for the example tapped forward boost converter 1000 in FIG. 10 when low side switch 1022 is closed. Resonant inductance $L_{P,RES}$ 1018 and resonant capacitance 1016 form a series resonant circuit with resonant frequency $\omega_R$ of value $$\omega_R = \frac{1}{\sqrt{L_{S,LEAK} C_{RES}}}.$$

Resonant currents flow in both the primary and secondary windings. As in the previous examples, a half sinusoid current pulse will flow before diode 1004 becomes reverse biased to end its conduction period.

Capacitance $C_{RES}$ 1016 also supplies current into storage inductance $L_{STOR}$ 1014, energizing it. This storage current is approximately a linear ramp due to the much greater inductance of $L_{STOR}$ 1014. The current through low side switch 1022 is therefore the sum of the resonant and storage currents and is a half sinusoid pulse impressed on a linear ramp. The storage current is not reflected into the secondary winding and the secondary current therefore consists only of the resonant current and has the shape of a half sinusoid. The secondary current ceases once the half sinusoid completes and diode 1004 is reverse biased.

Figure 11E:
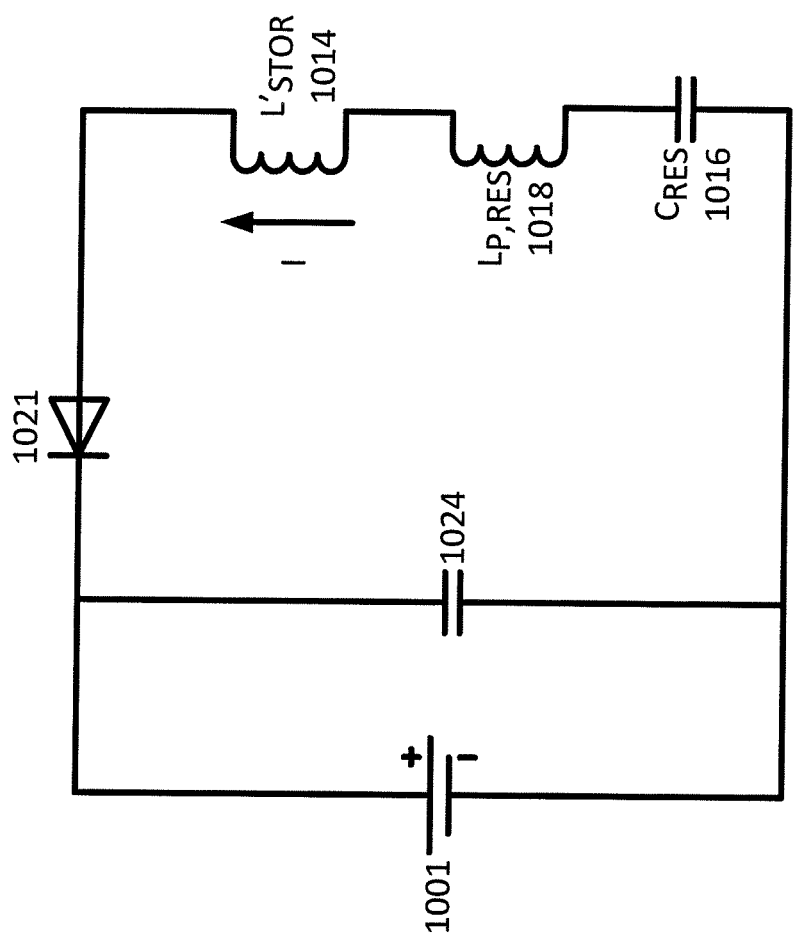
FIG. 11E is a schematic diagram illustrating an equivalent circuit for the input portion of the example tapped forward boost converter 1000 in FIG. 10 when the low side switch 1022 opens.

The storage current through low side switch 1022 continues until it is opened to end its conduction period. The voltage across storage inductance $L_{STOR}$ 1014 then reverses to maintain the current and forward biases diode 1021 across high side switch 1222. FIG. 11E is a schematic diagram illustrating an equivalent circuit for the input portion of the example tapped forward boost converter 1000 in FIG. 10 when low side switch 1022 is opened.

The storage current decreases linearly to zero and diode 1021 becomes reverse biased. No secondary current flows since diode 1004 is reverse biased.

Figure 12:
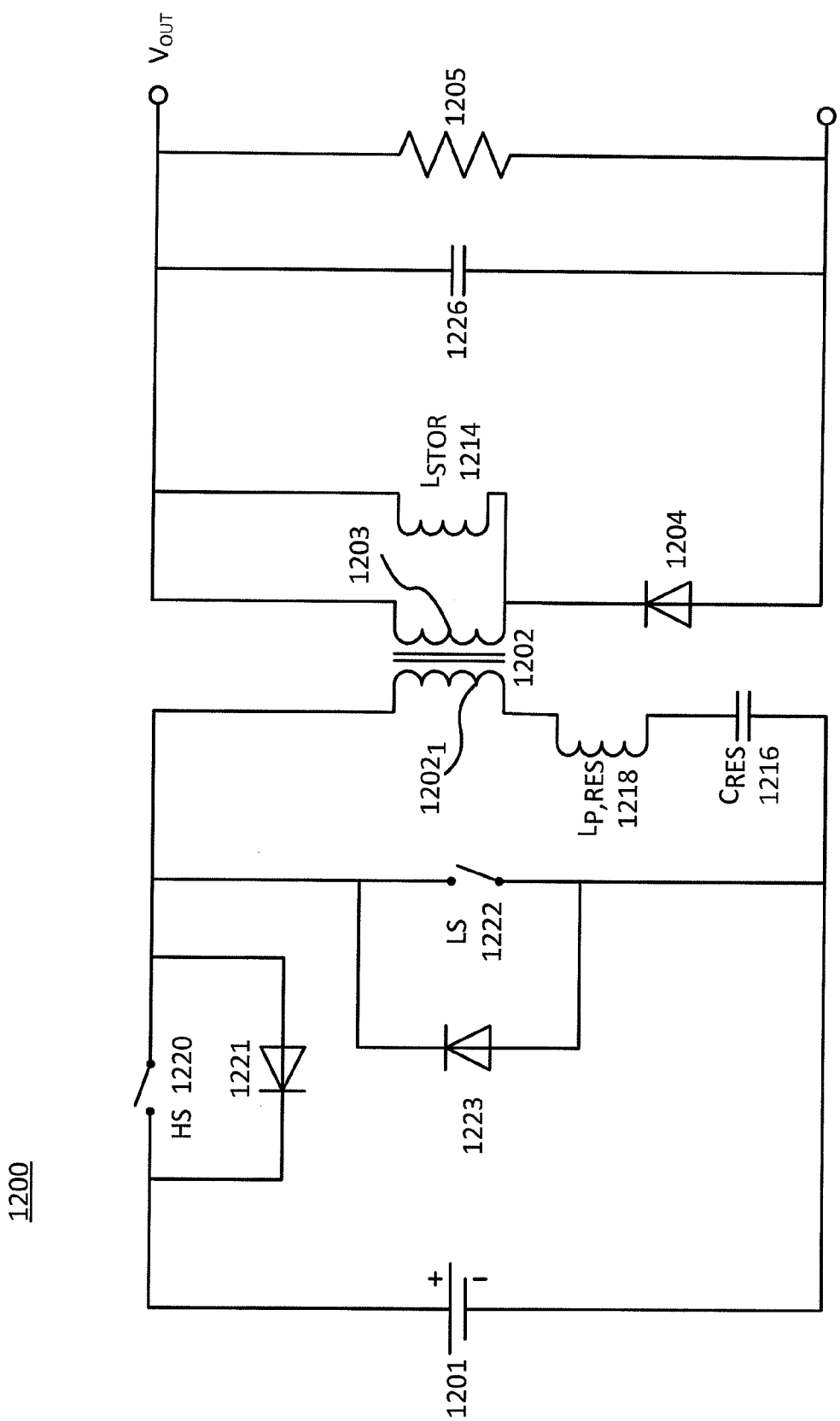
FIG. 12 is a schematic diagram illustrating an example forward boost converter operated in the reverse direction to forward boost converter 600 in FIG. 6.

FIG. 12 is a schematic diagram illustrating an example forward boost converter operated in the reverse direction to forward boost converter 600. The example forward boost converter 1200 includes anti-phase transformer 1202 with primary winding 1203 and secondary winding 1202₁. Transformer 1002 has a "transformer turns ratio" of 1/N, where N is the ratio of the number of turns in primary winding 1203 to the number of turns in secondary winding 1202₁.

Forward boost converter 1200 also includes input source 1201, resonant capacitance $C_{RES}$ 1216, resonant inductance 1218, output capacitance 1226, and resistive load 1205, coupled together as shown. Controllable switches 1220, 1222 replace diodes 620, 622 in previous embodiments, and diode 1204 replaces primary switch 604 in previous embodiments.

Tapped forward boost converter 1000 could have an advantage, at least at low input power, over forward boost converter 1200. Forward boost converter 1200 has similar difficulties at low power as forward boost converters 600, 900. If the "ON" time of low side switch 1222 is too short then the resonant half sinusoid pulse will not have time to complete and diode 1204 will still be conducting when switch 1222 turns "OFF" leading to conduction losses in diode 1204.

The power transferred into loads 1005, 1205 in reverse operation of forward boost converters 1000, 1200 is proportional to the voltage across primary winding 1002₁, 1202₁ when switch 1020, 1220 is closed and diode 1004, 1204 is not conducting. In forward boost converter 1200 this voltage is $V_{OUT}/N$. In tapped forward boost converter 1000 this voltage is $V_{OUT}/N_T$. Since $N_T<N$ the primary winding voltage in tapped forward boost converter 1000 can be higher than in known forward boost converter 1200 for the same values of $V_{IN}$ and $V_{OUT}$ by adjusting the value of $N_T$.

Similarly to the previous described tapped forward boost converter embodiments, if the voltage of primary winding 1002₁ in tapped forward boost converter 1000 is increased relative to the voltage of primary winding 1202₁ in forward boost converter 1200, the power transferred into load 1005 relative to the power transferred into load 1205 will also be increased. The "ON" time of switch 1020 can therefore be reduced relative to the "OFF" time of primary switch 1220. The "ON" time of switch 1022 can be increased relative to the "ON" time of switch 1222 for the same power level. The increased "ON" time could allow the half sinusoid to complete and avoid losses in diode 1004. Tapped forward boost converter 1000 could therefore have improved low power performance relative to forward boost converter 1200.

The foregoing describes particular embodiments, but is not meant to be limiting. For example, although an anti-phase transformer was used in the example of reverse operation of a tapped forward boost converter, an in-phase transformer could be used. Although the parasitic leakage inductance of transformer 202, 702, 1002 is used to form a resonant circuit with resonant capacitance 216, 716, 1016, a dedicated and separate, discrete inductor could be used for that purpose. Although the magnetisation inductance of the transformer 202, 702, 1002 is used as the storage inductance 214, 714, 1014, a dedicated and separate, discrete inductor could be used for this purpose.

As disclosed herein, a switching mode power converter coupled between a first terminal pair and a second terminal pair includes a first inductance 114, 214, 714, 1014 coupled to a first switch 104, 204, 704, 1004 in a first circuit path across the first terminal pair, a capacitance 116, 216, 716, 1016 coupled to a second inductance 118, 218, 718, 1018 in a second circuit path, a tapped transformer 102', 202, 702, 1002, a second switch 120, 220, 720, 1020 and a third switch 122, 222, 722, 1022. The tapped transformer has a first winding 102₁, 202₁, 702₁, 1002₁ coupled across the first inductance and a second winding coupled to the second circuit path. The tapped transformer also has a second winding 103, 203, 703, 1003 having a tapped winding portion 103₁, 203₁, 703₁, 1003₁.

The first switch couples the first inductance across the first terminal pair during a conduction period of the first switch. The second switch completes a circuit between the second terminal pair and the second circuit path through the tapped winding portion during a conduction period of the second switch. The third switch completes a circuit that includes the second circuit path and the second winding during a conduction period of the third switch.

The second circuit path could also be coupled to the first inductance through the second winding during the conduction period of the third switch, and/or through the tapped winding portion during the conduction period of the second switch.

The possible couplings of the second circuit path may be considered a third circuit path in which the second circuit path is coupled to the first inductance through the tapped winding portion of the tapped transformer, and a fourth circuit path in which the second circuit path is coupled to the first inductance through the second winding of the transformer. The second switch completes a circuit between the second terminal pair and one of: the second circuit path and the third circuit path through the tapped winding portion during a conduction period of the second switch. The third switch completes a circuit that includes another of: the second circuit path and the fourth circuit path through the second winding during a conduction period of the third switch.

In embodiments in which the second switch completes a circuit between the second terminal pair and the second circuit path, the third switch completes a circuit that includes the fourth circuit path, which would be "another" of the second circuit path and the fourth circuit path. The third switch could complete a circuit that includes either of the second circuit path and the fourth circuit path through the second winding in embodiments in which the second switch completes a circuit between the second terminal pair and the third circuit path.

The first terminal pair could be an input terminal pair and the second terminal pair could be an output terminal pair, in which case the capacitance could transfer energy to the output terminal pair during the conduction period of the second switch. The first inductance could then be coupled to the capacitance and transfer energy to the output terminal pair during the conduction period of the second switch, or transfer energy to the capacitance during the conduction period of the third switch.

The first terminal pair could instead be an output terminal pair, in which case the second terminal is an input terminal pair. The first inductance transfers energy to the output terminal pair during the conduction period of the first switch. The first inductance is coupled to the capacitance and stores energy from the input terminal pair during the conduction period of the second switch, or transfers energy to the output terminal pair during the conduction period of the first switch. The capacitance could transfer energy to the output terminal pair on a conduction period of the third switch.

A method of operation of such a switching mode power converter could involve closing of the first switch to couple the first inductance across the first terminal pair during a conduction period of the first switch, closing of the second switch to complete a circuit between the second terminal pair and one of the second circuit path and the third circuit path through the tapped winding portion during the conduction period of the second switch so as to transfer energy into the second terminal pair, and closing of the third switch to complete a circuit that includes another of the second circuit path and the third fourth circuit path through the second winding during the conduction period of the third switch so as to transfer energy into the capacitance.

As noted above, switch control could be provided by control means. An apparatus could include a switching mode power converter, means for closing the first switch as disclosed herein, means for closing the second switch as disclosed herein, and means for closing the third switch as disclosed herein.

What has been described is merely illustrative of the application of principles of embodiments. Other arrangements and methods can be implemented by those skilled in the art without departing from the scope of the present invention.

For example, although the load in the preceding embodiments is shown as resistive, tapped forward boost converters as disclosed herein are not restricted to driving resistive loads.

We claim:

1. A switching mode power converter coupled between a first terminal pair and a second terminal pair, the converter comprising:
   a first inductance coupled to a first switch in a first circuit path across said first terminal pair, said first switch coupling said first inductance across said first terminal pair during a conduction period of said first switch;
   a tapped transformer having a first winding coupled across said first inductance and a second winding, said second winding having a tapped winding portion;
   a capacitance coupled to a second inductance in a second circuit path, said second circuit path being coupled to said first inductance through said tapped winding portion in a third circuit path and coupled to said first inductance through said second winding in a fourth circuit path;
   a second switch and a third switch, said second switch operated to be in a non-conducting state when said third switch is in a conducting state and said third switch operated to be in a non-conducting state when said second switch is in a conducting state,
   said second switch completing a circuit between said second terminal pair and one of: said second circuit path and said third circuit path through said tapped winding portion during a conduction period of said second switch,
   said third switch completing a circuit comprising another of: said second circuit path and said fourth circuit path through said second winding during a conduction period of said third switch.

2. The switching mode power converter of claim 1, wherein said first terminal pair and said second terminal pair share a common terminal.

3. The switching mode power converter of claim 1, said first terminal pair comprising an input terminal pair, said second terminal pair comprising an output terminal pair, said capacitance transferring energy to said output terminal pair during said conduction period of said second switch.

4. The switching mode power converter of claim 3, said first inductance being coupled to said capacitance and transferring energy to said output terminal pair during said conduction period of said second switch.

5. The switching mode power converter of claim 3, said first inductance being coupled to said capacitance and transferring energy to said capacitance during said conduction period of said third switch.

6. The switching mode power converter of claim 1, said first terminal pair comprising an output terminal pair, said second terminal pair comprising an input terminal pair, said first inductance transferring energy to said output terminal pair during said conduction period of said first switch.

7. The switching mode power converter of claim 6, said first inductance being coupled to said capacitance and storing energy from said input terminal pair during said conduction period of said second switch.

8. The switching mode power converter of claim 7, said first inductance and said capacitance transferring energy to said output terminal pair during said conduction period of said first switch.

9. The switching mode power converter of claim 7, said capacitance transferring energy to said output terminal pair during said conduction period of said third switch.

10. The switching mode power converter of claim 1, said first inductance comprising magnetisation inductance of said tapped transformer.

11. The switching mode power converter of claim 1, said second inductance comprising leakage inductance of said tapped transformer.

12. A method of operation of a switching mode power converter coupled between a first terminal pair and a second terminal pair, the converter comprising: a first inductance coupled to a first switch in a first circuit path across said first terminal pair; a tapped transformer having a first winding coupled across said first inductance and a second winding, said second winding having a tapped winding portion; a capacitance coupled to a second inductance in a second circuit path, said second circuit path being coupled to said first inductance through said tapped winding portion in a third circuit path and coupled to said first inductance through said second winding in a fourth circuit path; a second switch and a third switch, said second switch operated to be in a non-conducting state when said third switch is in a conducting state and said third switch operated to be in a non-conducting state when said second switch is in a conducting state, said method comprising:

closing of said first switch to couple said first inductance across said first terminal pair during a conduction period of said first switch;

closing of said second switch to complete a circuit between said second terminal pair and one of said second circuit path and said third circuit path through said tapped winding portion during a conduction period of said second switch so as to transfer energy into said second terminal pair;

closing of said third switch to complete a circuit comprising another of: said second circuit path and said fourth circuit path through said second winding during a conduction period of said third switch so as to transfer energy into said capacitance.

13. Apparatus comprising:

a switching mode power converter coupled between a first terminal pair and a second terminal pair, the converter comprising: a first inductance coupled to a first switch in a first circuit path across said first terminal pair; a tapped transformer having a first winding coupled across said first inductance and a second winding, said second winding having a tapped winding portion; a capacitance coupled to a second inductance in a second circuit path, said second circuit path being coupled to said first inductance through said tapped winding portion in a third circuit path and coupled to said first inductance through said second winding in a fourth circuit path; a second switch and a third switch; said second switch operated to be in a non-conducting state when said third switch is in a conducting state and said third switch operated to be in a non-conducting state when said second switch is in a conducting state, means for closing said first switch to couple said first inductance across said first terminal pair during a conduction period of said first switch;

means for closing said second switch to complete a circuit between said second terminal pair and one of: said second circuit path and said third circuit path through said tapped winding portion during a conduction period of said second switch so as to transfer energy into said second terminal pair; and means for closing said third switch to complete a circuit comprising another of: said second circuit path and said fourth circuit path through said second winding during a conduction period of said third switch so as to transfer energy into said capacitance.

14. A switching mode power converter coupled between a first terminal pair and a second terminal pair, the converter comprising:

a first inductance coupled to a first switch in a first circuit path across said first terminal pair, said first switch coupling said first inductance across said first terminal pair during a conduction period of said first switch;

a capacitance coupled to a second inductance in a second circuit path;

a tapped transformer having a first winding coupled across said first inductance and a second winding coupled to said second circuit path, said second winding having a tapped winding portion;

a second switch and a third switch, said second switch operated to be in a non-conducting state when said third switch is in a conducting state and said third switch operated to be in a non-conducting state when said second switch is in a conducting state, said second switch completing a circuit between said second terminal pair and said second circuit path through said tapped winding portion during a conduction period of said second switch, said third switch completing a circuit comprising said second circuit path and said second winding during a conduction period of said third switch.

15. The switching mode power converter of claim 14, said second circuit path being further coupled to said first inductance through said second winding during said conduction period of said third switch.

16. The switching mode power converter of claim 14, said second circuit path being further coupled to said first inductance through said tapped winding portion during said conduction period of said second switch.

17. The switching mode power converter of claim 16, said second circuit path being further coupled to said first inductance through said second winding during said conduction period of said third switch.

18. The switching mode power converter of claim 14, wherein said first terminal pair and said second terminal pair share a common terminal.

19. The switching mode power converter of claim 14, said first inductance comprising magnetisation inductance of said tapped transformer.

20. The switching mode power converter of claim 14, said second inductance comprising leakage inductance of said tapped transformer.

* * * * *